US012591567B2

(12) United States Patent (10) Patent No.: US 12,591,567 B2
Currell et al. (45) Date of Patent: Mar. 31, 2026

(54) LEARNING AND PERSONAL DATA MANAGEMENT PLATFORM

(71) Applicant: Royal Bank of Canada, Toronto (CA)

(72) Inventors: Nathan Currell, Toronto (CA); Hilton Luu, Calgary (CA); Linna Zhang, Vancouver (CA); Abdellah Ghassel, Ottawa (CA)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 18/809,814

(22) Filed: Aug. 20, 2024

(65) Prior Publication Data

US 2025/0068625 A1 Feb. 27, 2025

Related U.S. Application Data

(60) Provisional application No. 63/534,290, filed on Aug. 23, 2023.

(51) Int. Cl.
*G06F 7/00* (2006.01)
*G06F 16/242* (2019.01)

(52) U.S. Cl.
CPC .................................. *G06F 16/243* (2019.01)

(58) Field of Classification Search
CPC .... G06F 16/243; G06F 16/285; G06F 16/957; G06F 16/953; G06F 16/9558; G06F 16/24522; G06F 16/90332; G06F 16/3344; G06F 16/3347; G06F 16/3326; G06F 16/3349; G06F 16/24545; G06F 12/0246; G06F 12/0837; G06F 12/0868; G06F 21/6227; G06F 21/554; G06F 21/552

See application file for complete search history.

(56) References Cited

U.S. PATENT DOCUMENTS

| | | | | |
|---|---|---|---|---|
| 5,920,859 | A * | 7/1999 | Li | ........................ G06F 16/951 |
| | | | | 707/999.005 |
| 11,928,569 | B1 * | 3/2024 | Douthit | .................. G06N 20/00 |
| 2024/0330290 | A1 * | 10/2024 | Shrestha | ............. G06F 12/0246 |
| 2024/0354436 | A1 * | 10/2024 | Mukherjee | .......... G06F 16/3344 |
| 2025/0061139 | A1 * | 2/2025 | Levinson | ............ G06F 16/3326 |
| 2025/0068625 | A1 * | 2/2025 | Currell | ................. G06F 16/243 |
| 2025/0130982 | A1 * | 4/2025 | Gunawardana | ..... G06F 16/9024 |

* cited by examiner

*Primary Examiner* — Mohammad A Sana

(57) ABSTRACT

Methods, systems, and techniques for processing natural language queries. A natural language query related to personal information of the user is obtained. Query vectors that include embeddings of the query are generated and matched with document vectors generated from chunks of reference documents related to the personal data. The document chunks are retrieved from a database and used as context for a prompt to a large language model that is used to respond to the natural language query. The query itself is also included in the prompt. The query may be in respect of a particular goal, and the large language model's response may include recommendations to help the user achieve that goal.

20 Claims, 19 Drawing Sheets

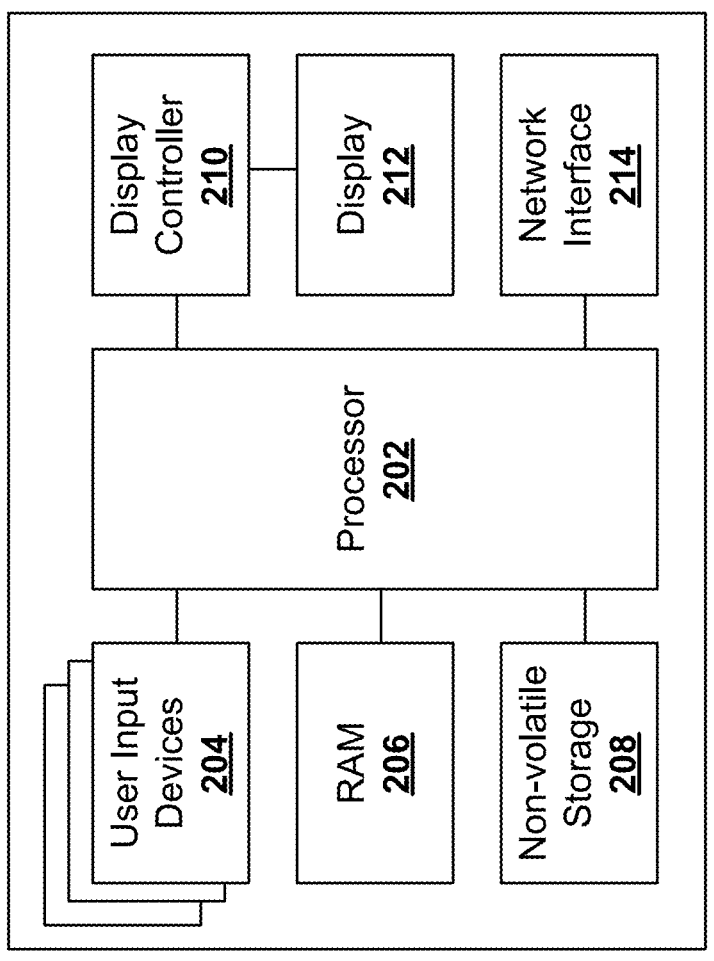
FIG. 2

600

I want to learn more about...

credit cards    debt    investing budgeting    taxes    insurance retirement    saving    home ownership select all that apply continue

606

1104

Asset

Chequing/Savings

Insitution 1    $10,000

Insititution 2    $5,000

Investments

Account 1    (FHSA) $4,000

Account 2    (RRSP) $0

Add More +

Debt

Account 3    (lon+) $1,000

Account 4    (Student Loans) $5,000

Add More +

1102

76%

+13,000

○ Stable      ○ Weak

Figures 12A, 12B, 12C, 12D:
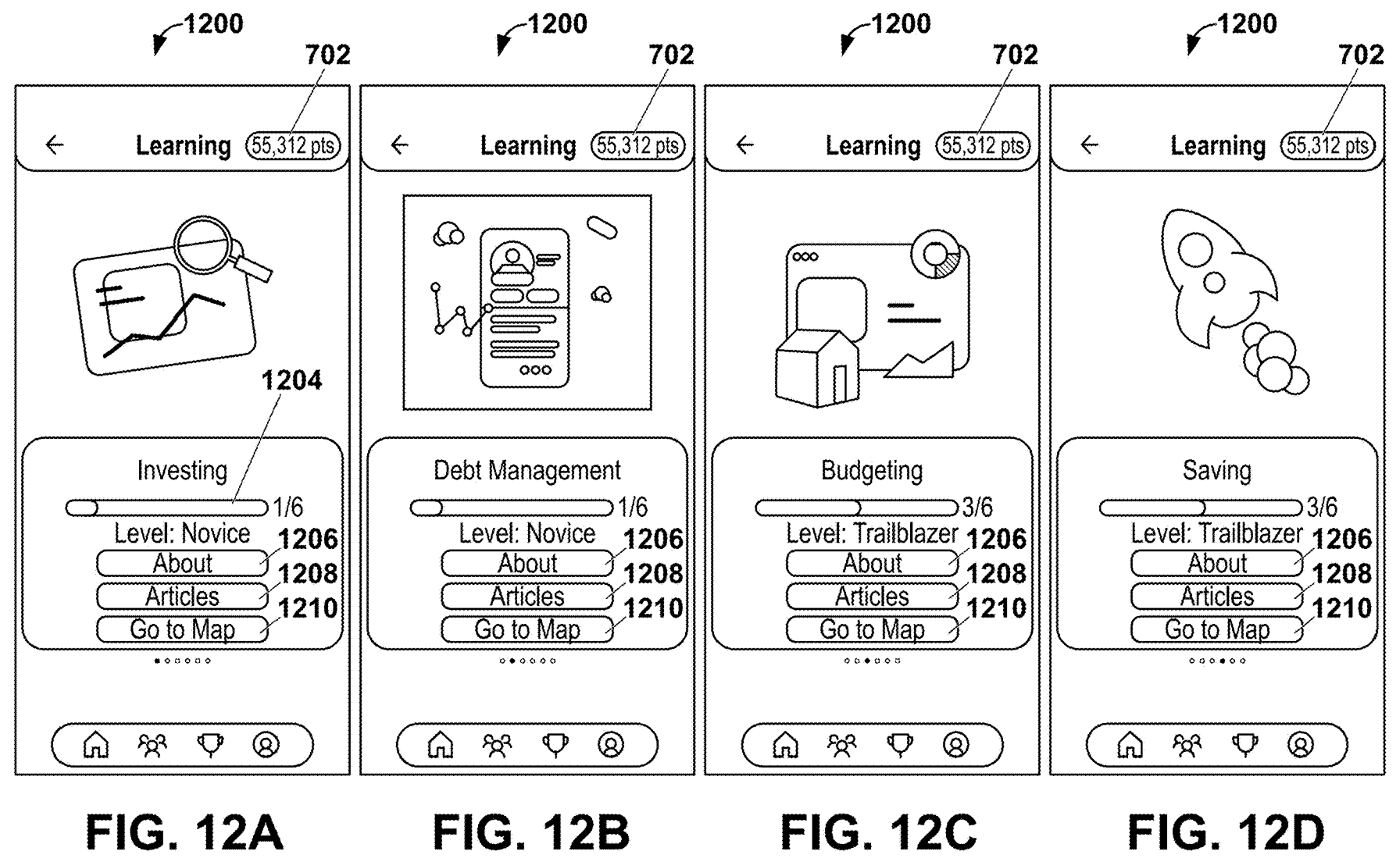

1200

702

Learning  55,312 pts

Investing

Level: Novice  1/6

1204

1206
1208
1210

About
Articles
Go to Map

Learning  55,312 pts

Debt Management

Level: Novice  1/6

1206
1208
1210

About
Articles
Go to Map

Learning  55,312 pts

Budgeting

Level: Trailblazer  3/6

1206
1208
1210

About
Articles
Go to Map

Learning  55,312 pts

Saving

Level: Trailblazer  3/6

1206
1208
1210

About
Articles
Go to Map

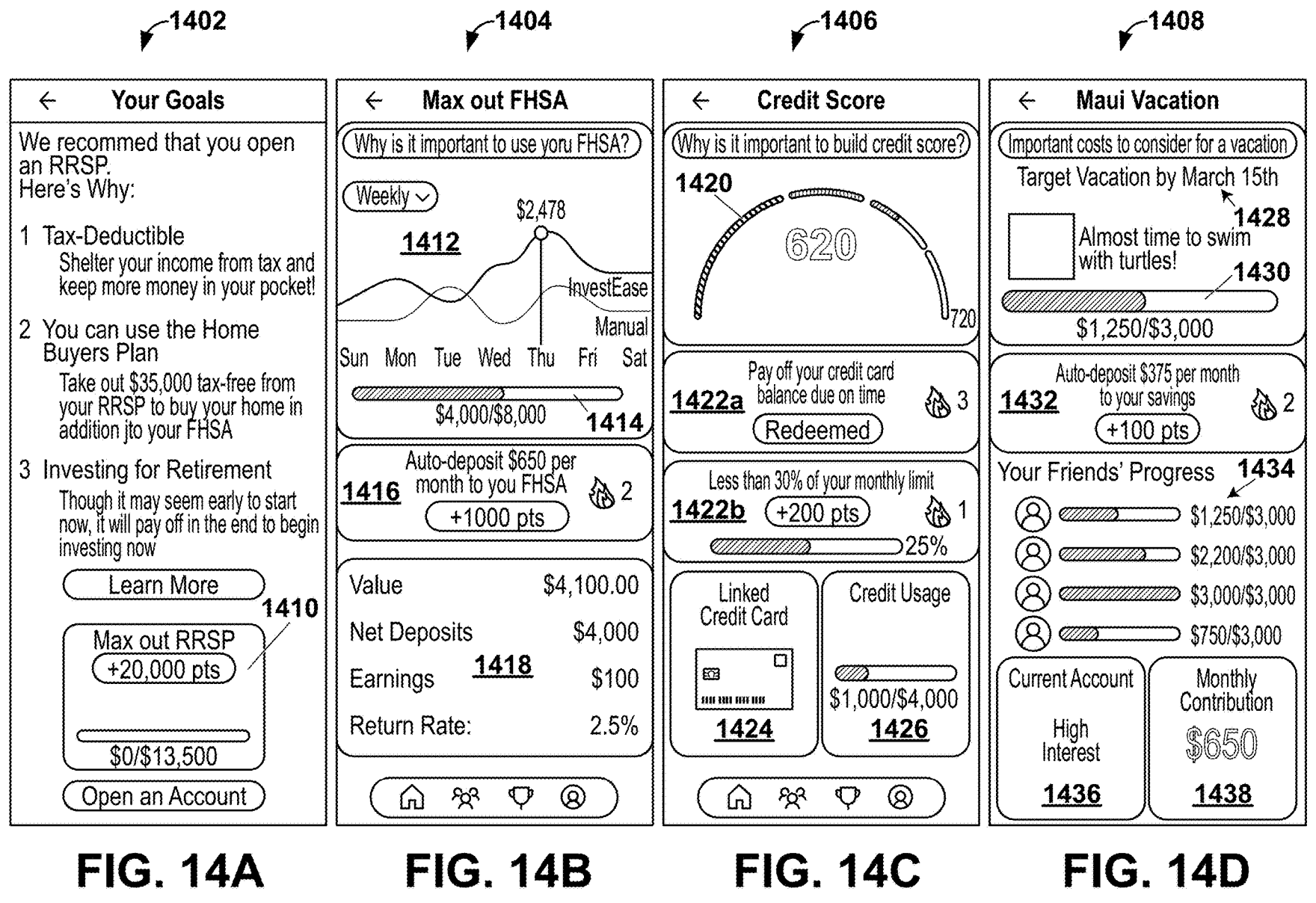

↵  Your Goals

We recommend that you open an RRSP. Here's Why:

1 Tax-Deductible
Shelter your income from tax and keep more money in your pocket!

2 You can use the Home Buyers Plan
Take out $35,000 tax-free from your RRSP to buy your home in addition jto your FHSA 3 Investing for Retirement
Though it may seem early to start now, it will pay off in the end to begin investing now Learn More — 1410

Max out RRSP
+20,000 pts $0/$13,500

Open an Account

↵  Max out FHSA

Why is it important to use your FHSA?

Weekly ⌄  1412

$2,478

InvestEase

Manual

Sun  Mon  Tue  Wed  Thu  Fri  Sat $4,000/$8,000  1414

Auto-deposit $650 per month to you FHSA  1416  🪶 2

+1000 pts

Value          $4,100.00
Net Deposits        $4,000
Earnings  1418    $100
Return Rate:        2.5%

↵  Credit Score

Why is it important to build credit score?  1420

720

620

Pay off your credit card balance due on time  1422a  🪶 3

Redeemed

Less than 30% of your monthly limit  1422b  🪶 1

+200 pts    25%

Linked Credit Card  1424

Credit Usage $1,000/$4,000  1426

↵  Maui Vacation

Important costs to consider for a vacation  1428

Target Vacation by March 15th

Almost time to swim with turtles!  1430

$1,250/$3,000

Auto-deposit $375 per month to your savings  1432  🪶 2

+100 pts

Your Friends' Progress  1434

👤  $1,250/$3,000
👤  $2,200/$3,000
👤  $3,000/$3,000
👤  $750/$3,000

Current Account
High Interest  1436

Monthly Contribution
$650  1438

FIG. 14D

1500 qa_template = " " "

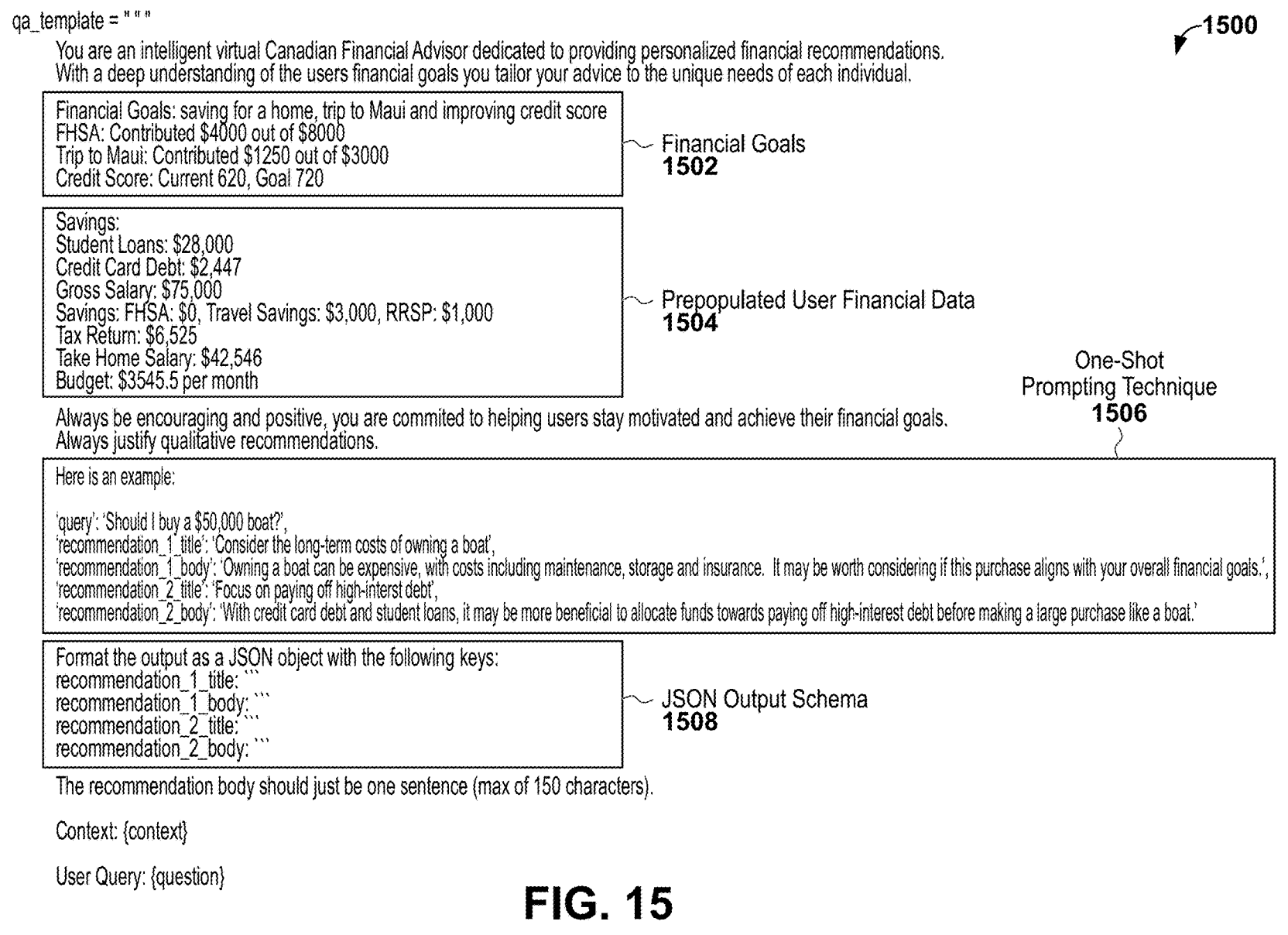

You are an intelligent virtual Canadian Financial Advisor dedicated to providing personalized financial recommendations.
With a deep understanding of the users financial goals you tailor your advice to the unique needs of each individual.

Financial Goals: saving for a home, trip to Maui and improving credit score
FHSA: Contributed $4000 out of $8000
Trip to Maui: Contributed $1250 out of $3000
Credit Score: Current 620, Goal 720

Financial Goals 1502

Savings:
Student Loans: $28,000
Credit Card Debt: $2,447
Gross Salary: $75,000
Savings: FHSA: $0, Travel Savings: $3,000, RRSP: $1,000
Tax Return: $6,525
Take Home Salary: $42,546
Budget: $3545.5 per month

Prepopulated User Financial Data 1504

Always be encouraging and positive, you are commited to helping users stay motivated and achieve their financial goals.
Always justify qualitative recommendations.

Here is an example:

'query': 'Should I buy a $50,000 boat?',
'recommendation_1_title': 'Consider the long-term costs of owning a boat',
'recommendation_1_body': 'Owning a boat can be expensive, with costs including maintenance, storage and insurance. It may be worth considering if this purchase aligns with your overall financial goals.',
'recommendation_2_title': 'Focus on paying off high-interest debt',
'recommendation_2_body': 'With credit card debt and student loans, it may be more beneficial to allocate funds towards paying off high-interest debt before making a large purchase like a boat.'

One-Shot Prompting Technique 1506

Format the output as a JSON object with the following keys:
recommendation_1_title: '''
recommendation_1_body: '''...
recommendation_2_title: '''
recommendation_2_body: '''

JSON Output Schema 1508

The recommendation body should just be one sentence (max of 150 characters).

Context: {context}

User Query: {question}

FIG. 15

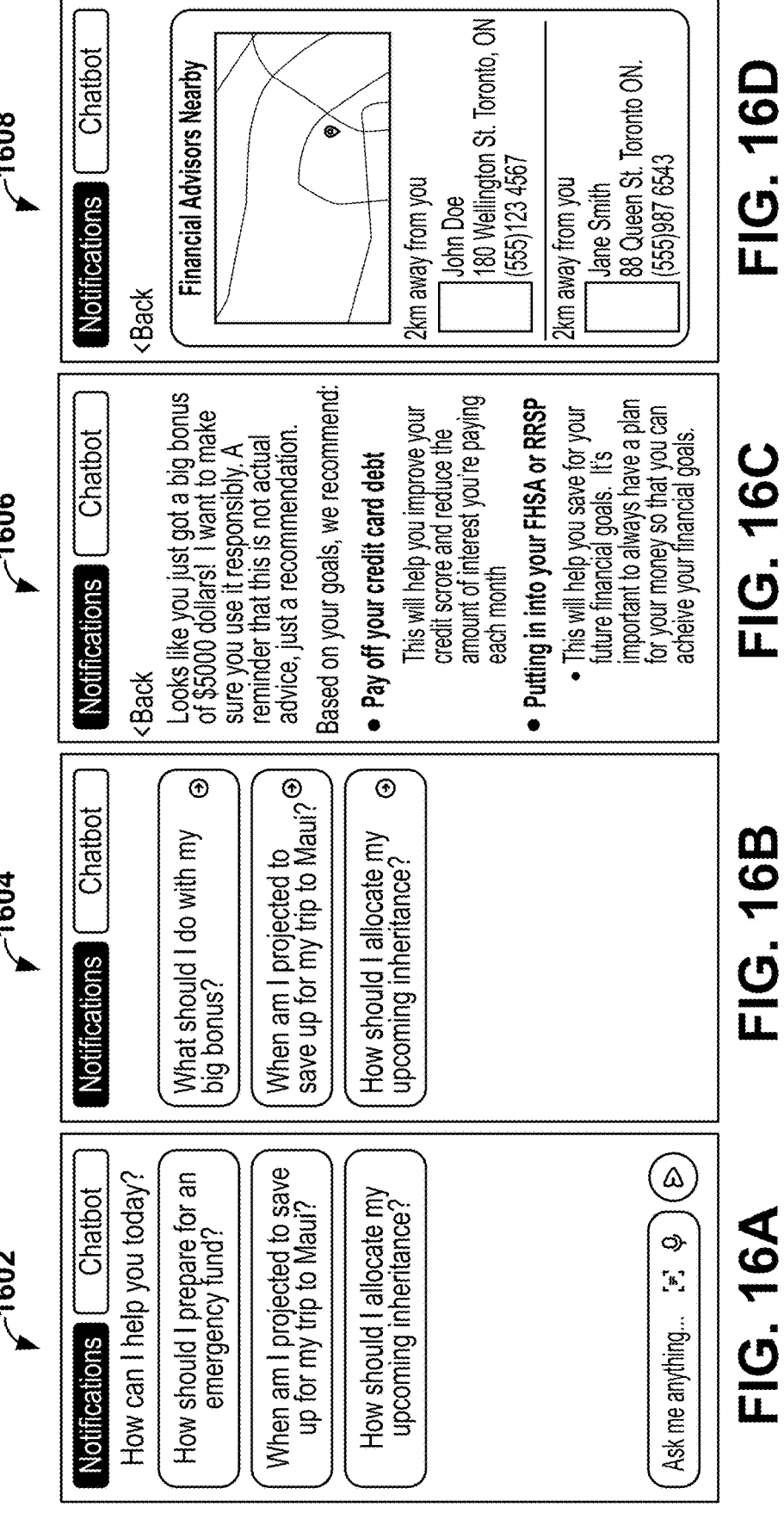

1602

Notifications | Chatbot

How can I help you today?

How should I prepare for an emergency fund?

When am I projected to save up for my trip to Maui?

How should I allocate my upcoming inheritance?

Ask me anything...

Notifications | Chatbot

What should I do with my big bonus?

When am I projected to save up for my trip to Maui?

How should I allocate my upcoming inheritance?

Notifications | Chatbot

<Back

Looks like you just got a big bonus of $5000 dollars! I want to make sure you use it responsibly. A reminder that this is not actual advice, just a recommendation.

Based on your goals, we recommend:

● Pay off your credit card debt
   This will help you improve your credit score and reduce the amount of interest you're paying each month ● Putting in into your FHSA or RRSP
   ● This will help you save for your future financial goals. It's important to always have a plan for your money so that you can achieve your financial goals.

Notifications | Chatbot

<Back

Financial Advisors Nearby

2km away from you
John Doe
180 Wellington St. Toronto, ON
(555)123 4567

2km away from you
Jane Smith
88 Queen St. Toronto ON.
(555)987 6543

FIG. 16D

LEARNING AND PERSONAL DATA MANAGEMENT PLATFORM

CROSS-REFERENCE TO RELATED APPLICATION

The present application claims priority to U.S. provisional patent application No. 63/534,290, filed on Aug. 23, 2023, and entitled "Learning and Personal Data Management Platform", the entirety of which is hereby incorporated by reference herein.

TECHNICAL FIELD

The present disclosure is directed at a learning and personal data management platform.

BACKGROUND

An individual's personal data is commonly stored online, often in several different sources. In the context of personal financial data, for example, just a single individual may be associated with data corresponding to various assets and obligations, such as bank accounts; debts; and loyalty program rewards. This data may be held by a variety of organizations that employ stringent cybersecurity measures given the sensitivity of such personal data. Consequently, the type, amount, and distributed nature of sensitive personal data can make it difficult for an individual to manage that data, and to be trained or coordinate with others in respect of that data. Additionally, the diversity of data can make it difficult to efficiently derive insights or recommendations in respect of that data.

SUMMARY

According to a first aspect, there is provided a method for personal data management, the method comprising: obtaining personal data of a user, in which the personal data comprises financial data of the user; obtaining at least one goal of the user through a graphical user interface; determining that the user has satisfied the at least one goal; and in response to the user satisfying at least one of the at least one goal, crediting the user with loyalty rewards points.

According to another aspect, there is provided a method comprising: obtaining a financial query from the user; generating query vectors comprising embeddings of the query; matching the query vectors with document vectors generated from chunks of financial documents; retrieving the chunks; and inputting: the query to a large language model; and the chunks as context to the large language model for use in responding to the query.

According to another aspect, there is provided a natural language query processing method, the method comprising: obtaining a natural language query related to personal financial data of a user; generating query vectors comprising embeddings of the query; matching the query vectors with document vectors generated from chunks of reference documents related to the personal financial data; retrieving the chunks from at least one database; generating a response to the natural language query by inputting to at least one large language model a prompt comprising: the natural language query; and the chunks as context for use in responding to the natural language query; and providing the response to the user.

The document vectors may be associated in the at least one database with respective identifiers identifying the reference documents used to generate the document vectors, and the method may further comprise: generating a link to at least one of the reference documents, respectively, in which the generating comprises identifying the at least one of the reference documents corresponding to at least one of the chunks by matching the at least one of the identifiers of the at least one of the reference documents to at least one of the document vectors generated from the at least one of the chunks; and providing the link to the user.

The method may further comprise, prior to the obtaining of the natural language query, detecting a trigger resulting from a change in the personal financial data of the user, in which the change comprises at least one of asset or liability values of the user as stored in the at least one database exceeding a trigger threshold, and in which the obtaining of the natural language query is performed in response to the trigger.

The method may further comprise intermittently updating the at least one of the asset or liability values in the at least one database by collecting the at least one of the asset or liability values through at least one application programming interface ("API") endpoint providing access to third party services, in which the collecting comprises accessing the third party services using respective login credentials or biometric identification of the user.

The change may comprise the asset values of the user increasing within a single day by more than the trigger threshold.

The method may further comprise, prior to the obtaining of the natural language query: generating the chunks from the reference documents, in which the reference documents are associated with respective identifiers; generating the document vectors from the chunks; and storing the document vectors with the identifiers in the at least one database.

The method may further comprise: obtaining the personal financial data of the user; obtaining at least one goal of the user related to the personal financial data through a graphical user interface; determining that the user has satisfied the at least one goal; and in response to the user satisfying at least one of the at least one goal, crediting the user with points.

Each of the at least one goal may be stored in the at least one database as a first lookup table, each of the at least one goal may comprise at least one task, and each of the at least one task may be stored in the at least one database as a second lookup table.

Each of the at least one goal may also be part of a user plan, and the user plan may be stored in the at least one database as a third lookup table.

The points may be allocated by a points provider, and crediting the user with the points may comprise instructing the points provider to credit the user with the points and providing credentials of the user for the points provider to the points provider.

The at least one goal may comprise a shared goal that is shared by multiple users of which the user is one, and the method may further comprise graphically displaying to the user: a first graphical interface element indicating respective progress towards the shared goal of each of the multiple users; and a second graphical interface element permitting the user to perform a task that causes the user to advance towards the shared goal.

The shared goal may be a monetary savings goal, and the task may be to contribute a set amount of funds of the user towards the monetary savings goal of the user.

The prompt may further comprise the personal financial data of the user and the natural language query may be in respect of the at least one goal of the user.

Inputting the prompt to the at least one large language model may comprise applying a few-shot prompting technique in which the prompt further comprises an example natural language query and at least one example response, and in which each of the at least one example response comprises a response title and a response body.

The prompt may further comprise instructions to format the response in JavaScript Object Notation (JSON) schema, with at least one respective title and body key for at least one response title and at least one response body to be output by the at least one large language model.

The at least one response title and at least one response body may provide at least one recommendation to advance towards the at least one goal to the user, and the method may further comprise submitting the JSON-formatted response to an API that displays the at least one recommendation to the user.

The method may further comprise displaying to the user on the same screen as the at least one recommendation, a graphical interface element permitting the user to perform a task that causes the user to advance towards the at least one goal.

The method may further comprise: displaying to the user an interactive learning module related to the at least one goal; and following completion of the interactive learning module by the user, crediting the user with additional ones of the points, in which the points are allocated by a points provider, and in which the crediting the user with the points comprises instructing the points provider to credit the user with the points and providing credentials of the user for the points provider to the points provider.

According to another aspect, there is provided a system comprising: at least one network interface; at least one processing unit communicatively coupled to the at least one network interface, in which the at least one processing unit is configured to perform any one or more of the above-described methods.

According to another aspect, there is provided at least one non-transitory computer readable medium having stored thereon computer program code that is executable by at least one processor and that, when executed by the at least one processor, causes the at least one processor to perform any one or more of the above described methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 2 is a block diagram of a server comprising part of the architecture of FIG. 1.

FIGS. 12A to 12D respectively depict various learning pages of the graphical user interface of the learning and personal data management platform, according to an example embodiment.

FIGS. 14A to 14D respectively depict a goals page, an investment page, a credit page, and a shared rewards page of the graphical user interface of the learning and personal data management platform, according to an example embodiment.

FIG. 15 depicts prompt engineering applied in respect of the learning and personal data management platform, according to an example embodiment.

FIGS. 16A-16D depict various notification screens presented by the learning and personal data management platform, according to an example embodiment.

DETAILED DESCRIPTION

An individual's sensitive personal data may take many forms. For example, personal data may be in the form of explicit identification, such as a birth certificate or driver's license; address information, such as a home address or an e-mail address; or financial information, such as the account no. and balance of a bank account. These different types of sensitive personal data are often stored separately and securely from each other by different organizations. The fact that the data are stored separately and securely creates technical impediments that make it difficult for the individual who owns the data to access all of the data concurrently and with permissions sufficient to share, analyze, and draw insights from the data.

The embodiments described herein are directed at a learning and personal data management platform that accesses several types of personal data concurrently, presents the data to a user of the platform, and allows the user to derive learning insights based on the data and to perform other tasks such as jointly share personal information with other platform users in pursuit of a goal that the users share. For example, in the context of personal information in the form of financial information, the platform may present to the user various learning modules based on their financial information for the purposes of education; incentivize or encourage the user to perform certain actions in response to their financial information, such as encouraging the user to invest unused cash; different users may share savings information in which they are pooling savings to reach a shared savings target; and various types of credits may be displayed to the user despite them being of different types (e.g., cash savings in a bank account, loyalty reward points, and in-application credits that may be converted to real-world rewards such as the loyalty reward points contingent on the user taking certain actions). As described further below, this permits users of the platform to collect a diverse array of their personal information that is stored on distinct, secure sources; selectively share it; derive insights from it; and take action in response to it.

Figure 1:
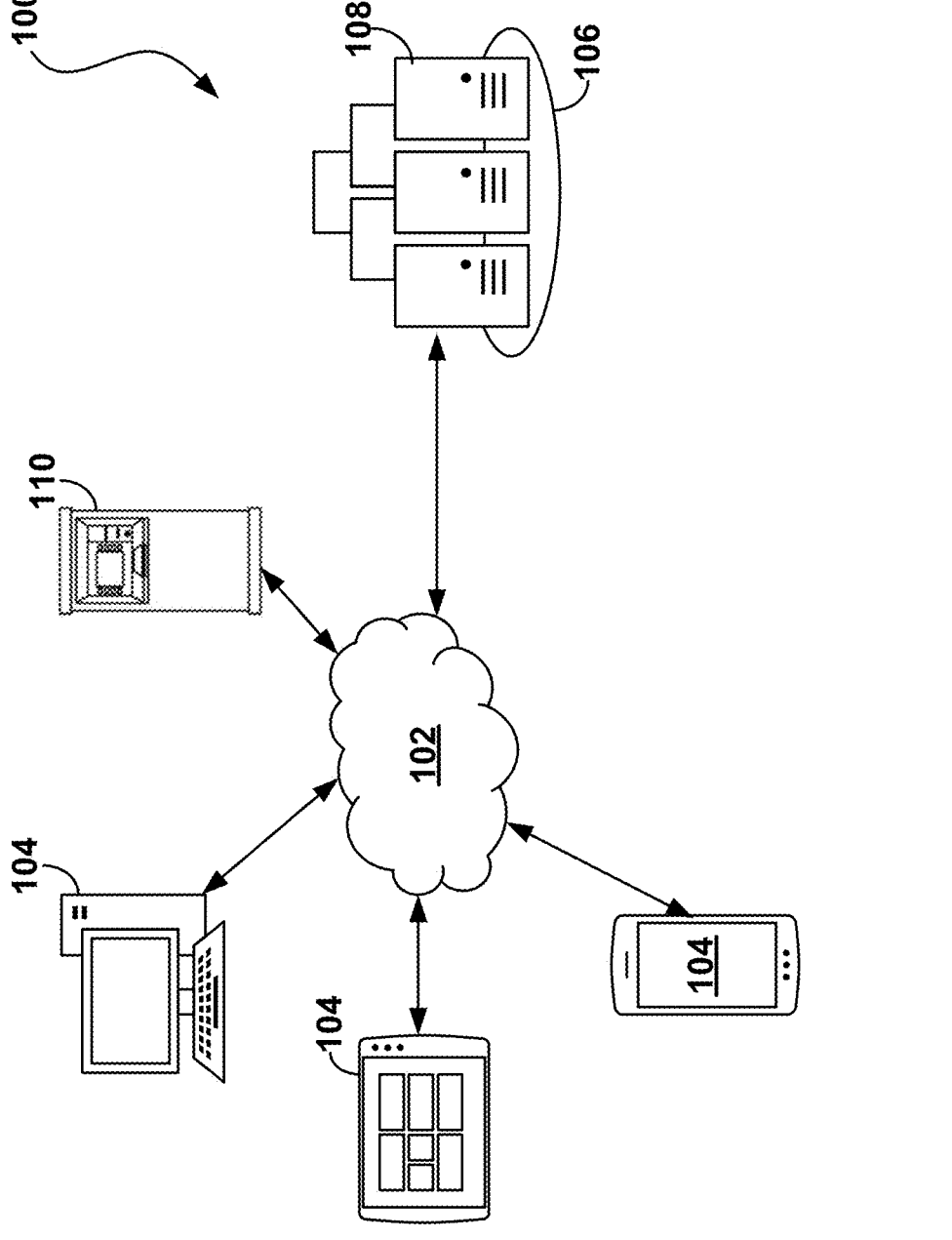
FIG. 1 is a network diagram illustrating one architecture used to implement a learning and personal data management platform, according to an example embodiment.

Referring now to FIG. 1, there is shown a computer network 100 that comprises an example embodiment of a learning and personal data management platform. More particularly, the computer network 100 comprises a wide area network 102 such as the Internet to which various user devices 104, an ATM 110, and data center 106 are communicatively coupled. The data center 106 comprises a number of servers 108 networked together to collectively perform various computing functions. For example, in the context of a financial institution such as a bank, the data center 106 may host online banking services that permit clients to log in to those servers using client accounts that give them access to various computer-implemented banking services, such as online fund transfers. Furthermore, individuals may appear in person at the ATM 110 to withdraw money from bank accounts controlled by the data center 106.

Referring now to FIG. 2, there is depicted an example embodiment of one of the servers 108 that comprises the data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code for execution at runtime by the processor 202; non-volatile storage 208, which stores the computer program code executed by the RAM 206 at runtime; a display controller 210, which is communicatively coupled to and controls a display 212; and a network interface 214, which facilitates network communications with the wide area network 104 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to act as a backend for a learning and personal data management platform, such as is described in more detail below. Additionally or alternatively, the servers 108 may collectively perform that method using distributed computing. While the system depicted in FIG. 2 is described specifically in respect of one of the servers 108, analogous versions of the system may also be used for the user devices 104, which depict a frontend of the learning and personal data management platform.

The embodiments described in respect of FIGS. 3 to 14D are described in respect of a user's personal data being financial data. However, in other embodiments the user's personal data may be non-financial, as mentioned above.

Figure 3:
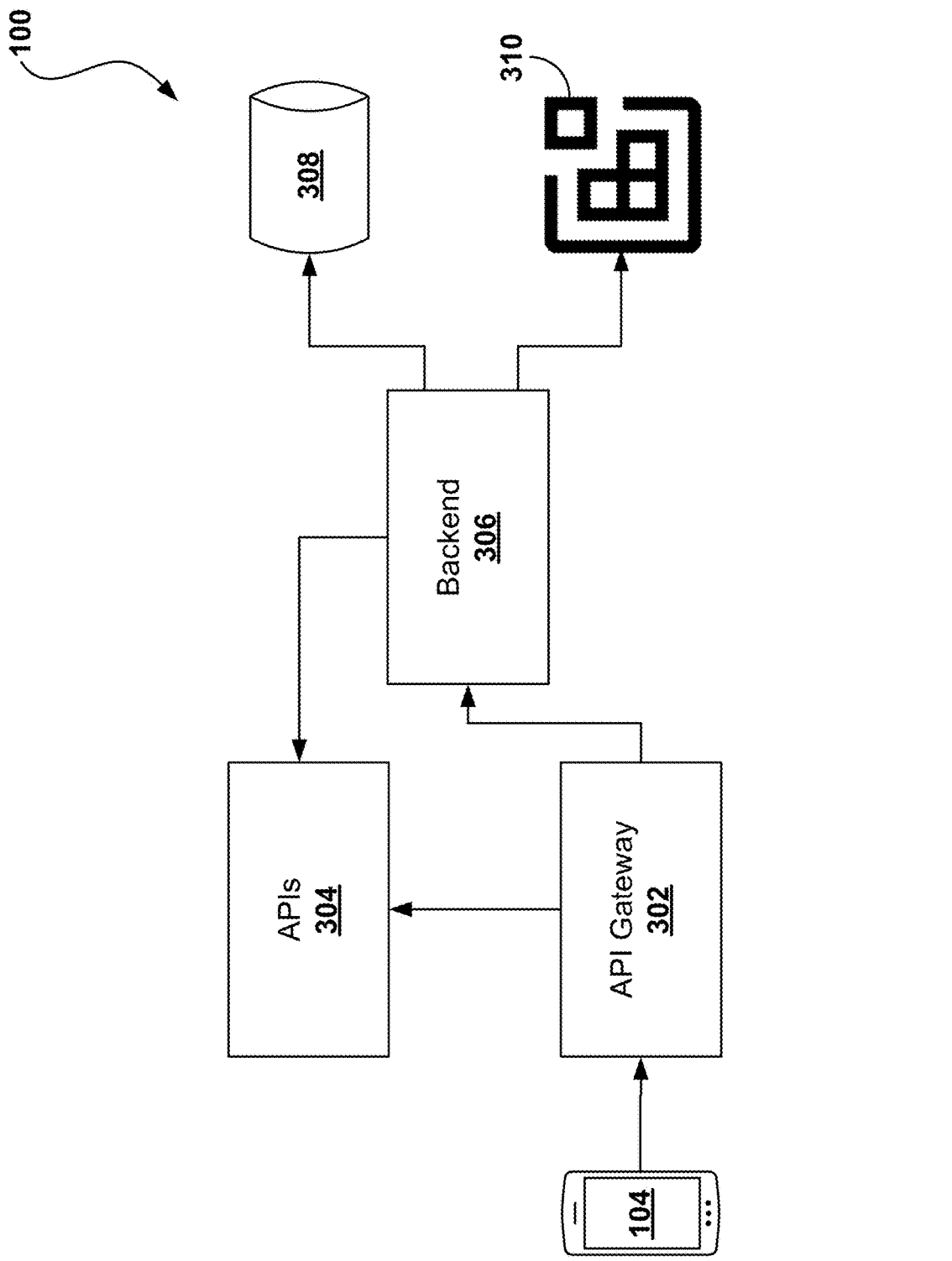
FIG. 3 is a functional block diagram of an architecture used to implement the learning and personal data management platform, according to an example embodiment.

Referring now to FIG. 3, there is shown a functional block diagram of an architecture used to implement the learning and personal data management platform 100, according to an example embodiment. The platform 100 comprises one of the user devices 104 on which a frontend of the platform 100 is implemented, as depicted in FIGS. 6 to 14D and as described in further detail below. The platform 100 comprises an application programming interface ("API") gateway 302, such as an Amazon™ API Gateway. The frontend running on the user device 104 provides access to the platform via the API gateway 302 following authentication at the user device 104 of the user's identity. This authentication may be done with login credentials or biometric identification (e.g., face or fingerprint recognition), for example.

The API gateway 302 uses a representation state transfer ("REST") API to access various APIs 304. As described further below, a user's login credentials may be submitted in API calls so as to obtain access to securely stored personal data held by third parties. Example APIs 304 may comprise:

1. a financial data API to view aggregated financial data, such as asset accounts (e.g., debit, savings, and investment) and debit accounts (e.g., credit cards and loans);
2. a rewards points API to view and potentially redeem loyalty program reward points from a points provider, which may be a third party (e.g., flight reward points);
3. an investment API to obtain information on investment portfolio growth and other metrics; and
4. an advisor API to find a local financial advisor.

Example financial data APIs are APIs made available by Plaid™ Inc.; example rewards points APIs are made available by Royal Bank of Canada™ in respect of its Avion™ loyalty rewards program and the Loyalty API™ made available by Square™, Inc.; example investment APIs made available by Royal Bank of Canada™ in respect of its InvestEase™ service offering and by Plaid™ Inc.; example advisor APIs are made available by Salesforce™, Inc., by the Royal Bank of Canada™ in connection with its Client View Integration Service, and the Google Maps™ API may also be used as or as part of the advisor API. Another example API comprises OpenAI™'s ChatGPT™ APIs, as described in more detail in respect of FIG. 4 below.

Via the API gateway 302, the user device 104 also has access to the platform's 100 backend 306. The backend 306 runs FastAPI™, which also grants the backend 306 access to the APIs 304. The backend 306 also runs a server environment, such as Node.js. The backend 306 is communicative with a data store 308, which may be implemented one or more different ways. For example, the data store 308 may comprise any one or more of a relational database that runs PostgreSQL™, a cloud-based service such as Amazon S3™, or a data as a service provider such as the Armada™ database as a service offering. Information such as articles on financial institution products, services, and other offerings; and investment information such as general information on investment principles and specific information on particular stocks or companies may be stored in the data store 308.

The data store 308 has access to real-time data (e.g., via a data as a service provider) and static data (e.g., via the relational database). While accessing real-time data may be more resource intensive, it also presents the user with data that is less likely to be stale than if a static relational database were used.

The functionality performed by the backend 306 may take the form of a software application that resides in the non-volatile storage 208 and that, during execution, is at least partially loaded into the RAM 206 for execution by the processor 202. The application may be containerized using Docker™, for example, and deployed using services such as OpenShift™ and Helios™.

Figure 5A:
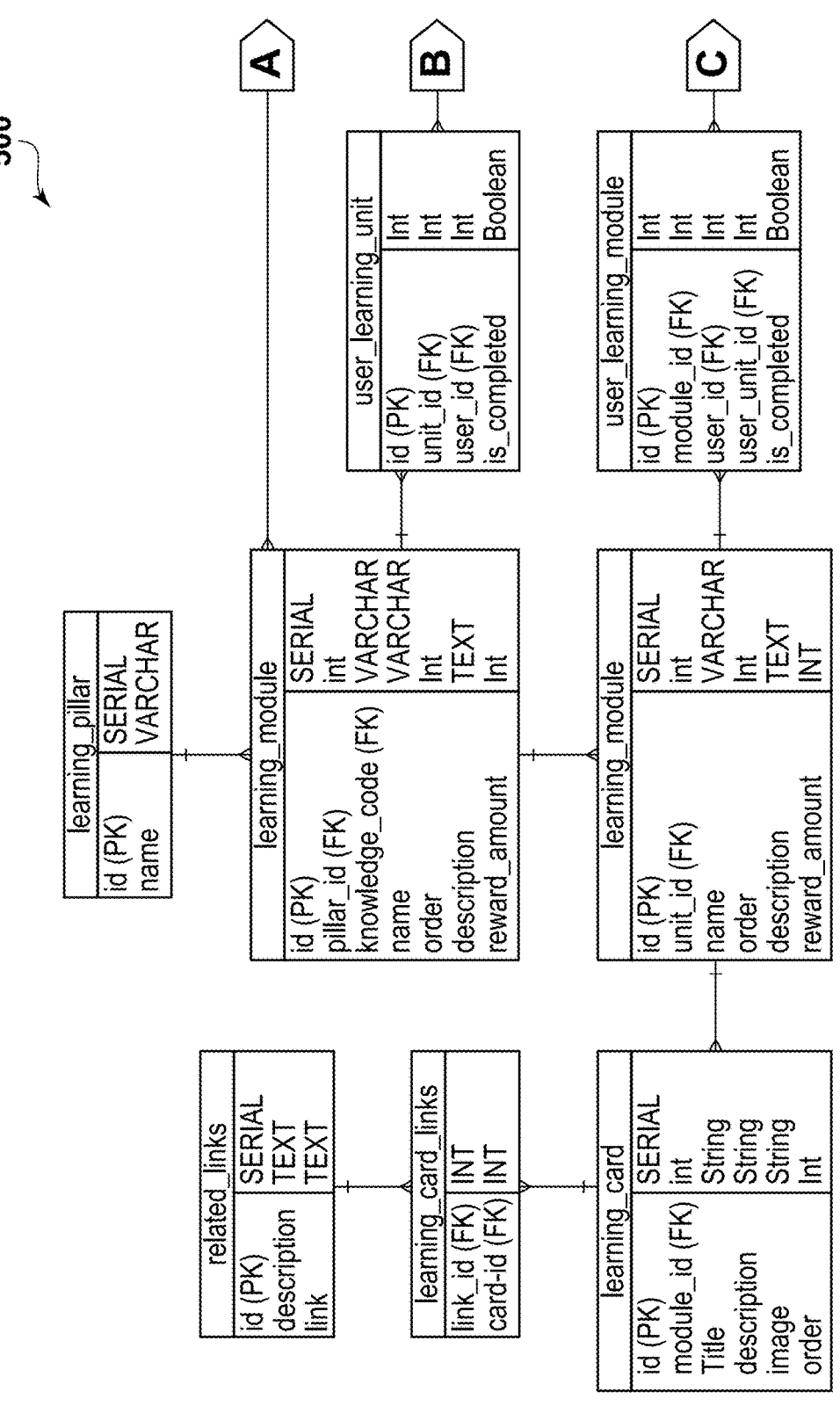
FIGS. 5A to 5D collectively depict a database schema used to implement the learning and personal data management platform, according to an example embodiment.
Figure 5B:
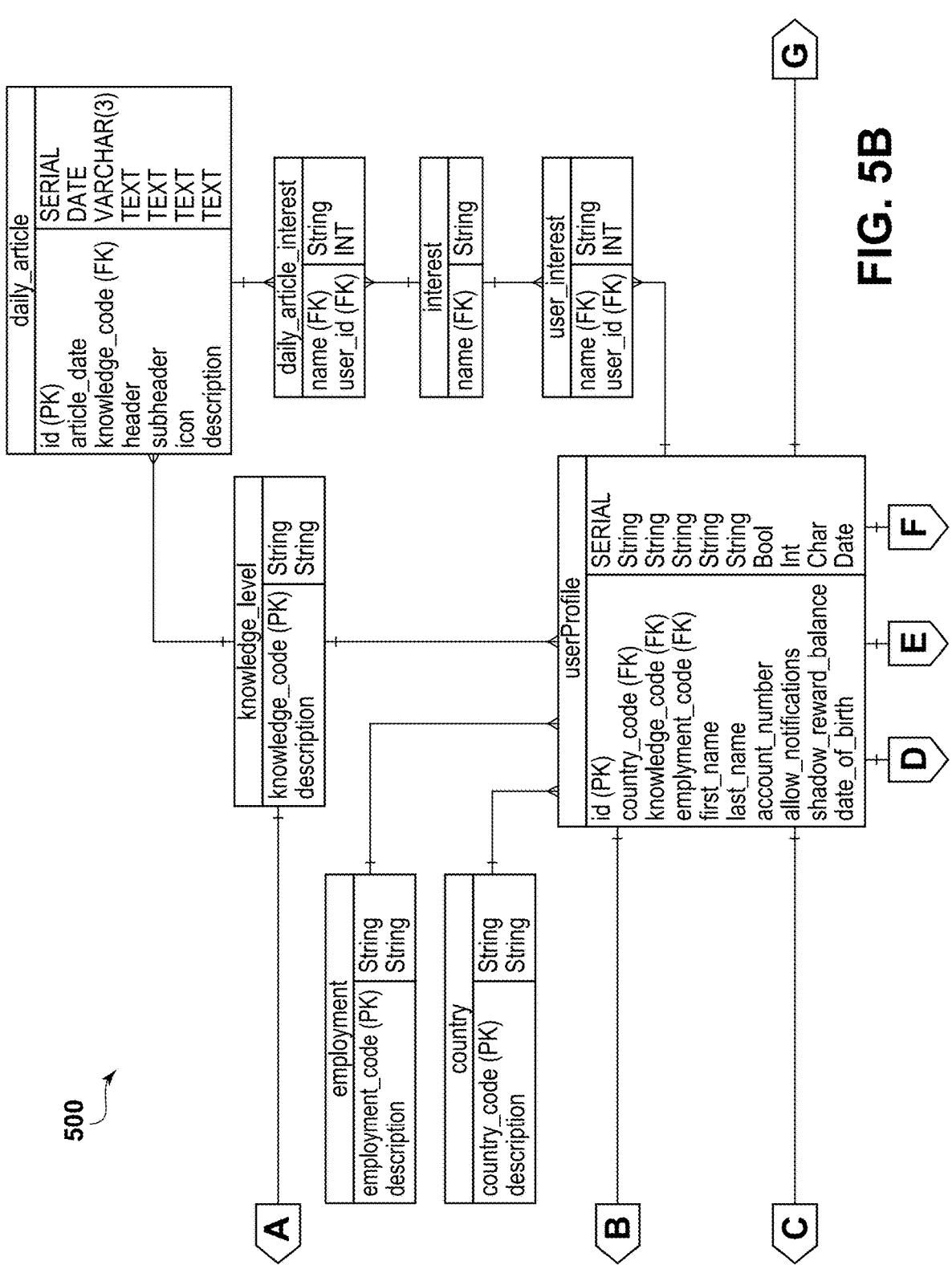
Figure 5C:
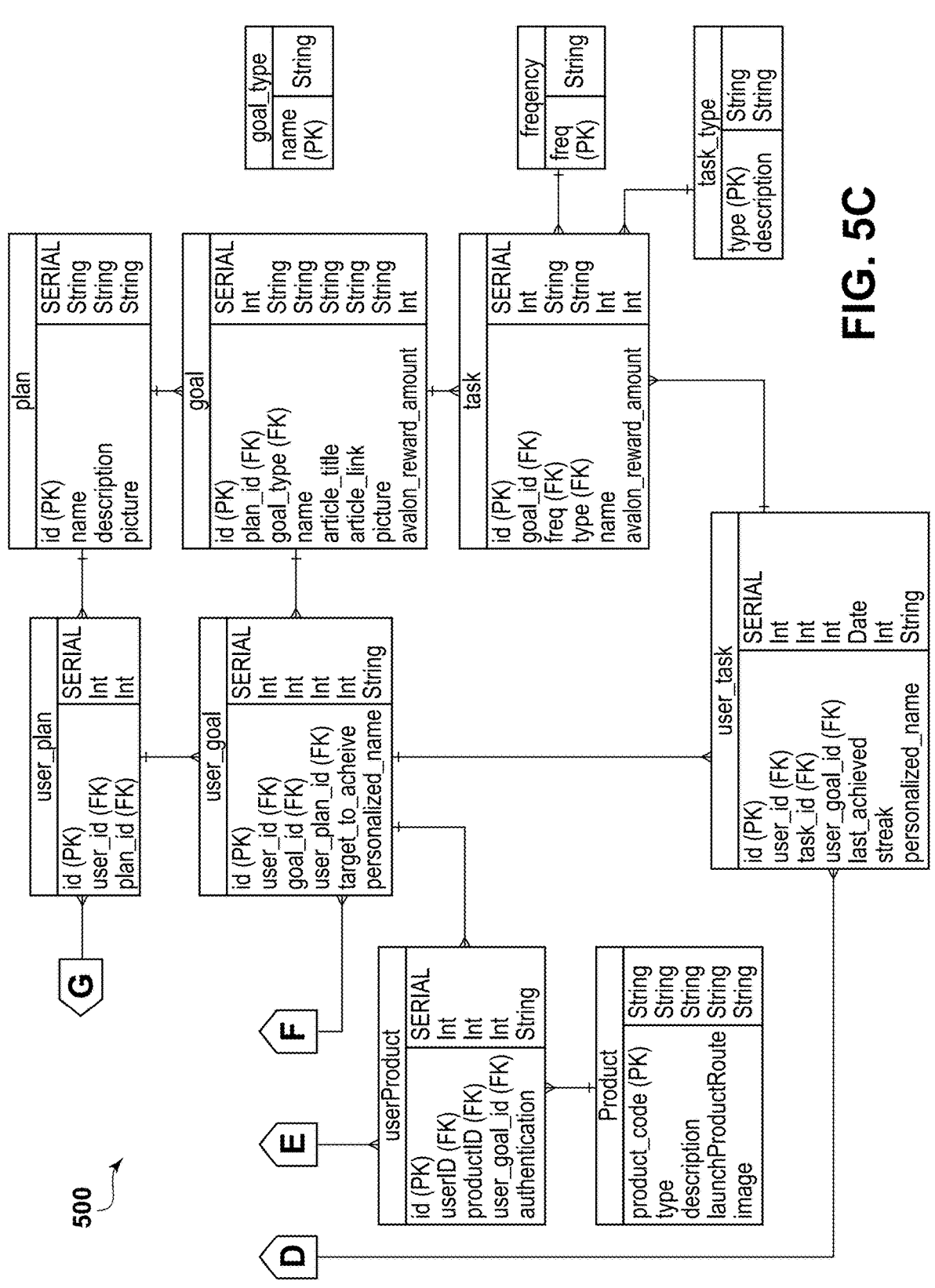

FIGS. 5A to 5D collectively depict a database schema 500 that may be used to store information in the data store 308. Generally speaking, the portion of the schema 500 shown in FIG. 5B depicts tables pertaining to the platform 100 onboarding a new user as well as daily articles that may be uploaded to the data store 308 or to a content management system (not depicted). The portion of the schema 500 shown in FIG. 5C show various lookup tables for user plans (e.g., savings for a home), goals, and tasks (i.e., actions to be taken in furtherance of goals). Accordingly, plans may comprise goals, and goals may comprise tasks. The user_plan, user_goal, and user_task tables track a user's progress on the objectives referenced in a plan, goal, and task, respectively. The userProduct and Product tables store connected financial institution accounts pertaining to a goal (e.g., a high interest savings account and loyalty rewards points, such as Avion™ points, in which case the points provider is the entity that grants and tracks those points). The portion of the schema 500 depicted in FIG. 5A is generally directed at learning functionality; i.e., using the platform 100 to educate users on financial literacy. In this regard, the learning_pillar, learning_unit, learning_module, and learning_card tables are lookup tables for various learning modules and curriculums. Each learning_pillar table (e.g., investment, debt management, budgeting, and saving) comprises one or more learning_unit tables; each learning_module comprises one or more learning_card tables. The learning-related tables are described in more detail in respect of FIGS. 13A-14D, below. The portion of the schema shown in FIG. 5D may in at least some embodiments be used to augment the schema 500 shown in FIGS. 5A to 5C to provide notification functionality as depicted in FIGS. 16A to 16D and as discussed further below.

Figure 6A:
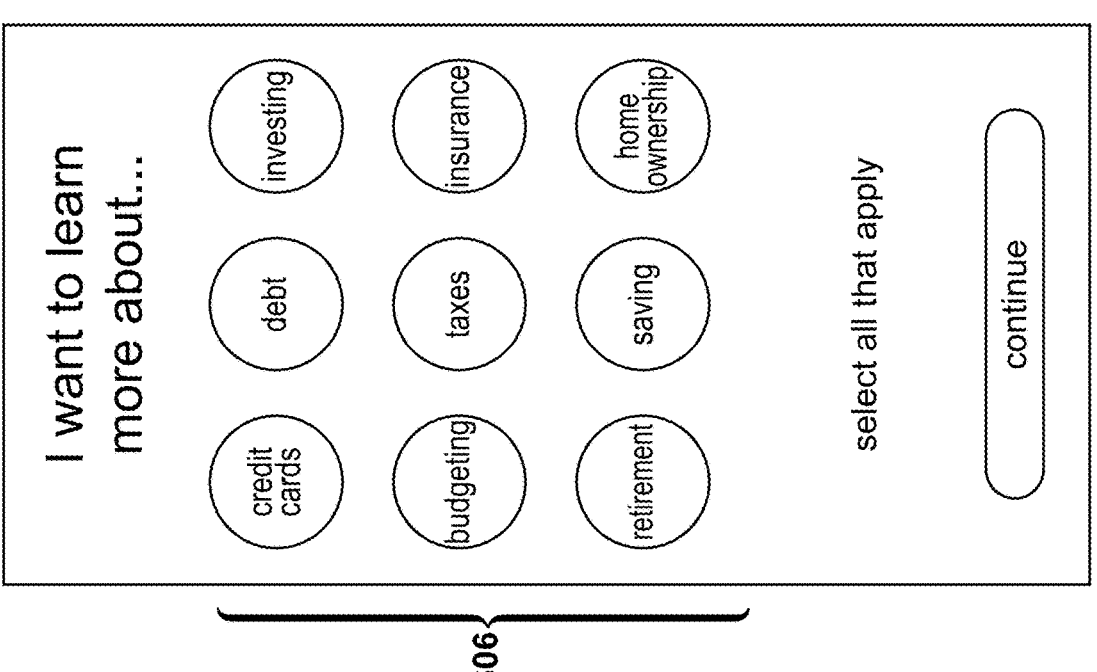
FIG. 6A depicts an example interests page of a graphical user interface presented to a user of the learning and personal data management platform, according to an example embodiment.

When using the platform 100, during onboarding the user inputs their interests into the platform 100 using a graphical user interface that comprises part of the platform's 100 front end and that is displayed on the user device 104. The user may, for example, input their interests via an interests page 600 as depicted in FIG. 6A. The interests page 600 comprises nine different topic buttons 606, representing various financial topics of interest: credit cards, debt, investing, budgeting, taxes, insurance, retirement, saving, and home ownership. The user indicates interest in various topics by touching the corresponding topic buttons 606. In FIG. 6A, the credit cards, investing, and home ownership buttons 606 are selected and consequently highlighted. The user device 104 transmits this information to the data store 308 via the backend 306 for storing in a relational database, as described above in respect of FIG. 3.

Figure 6B:
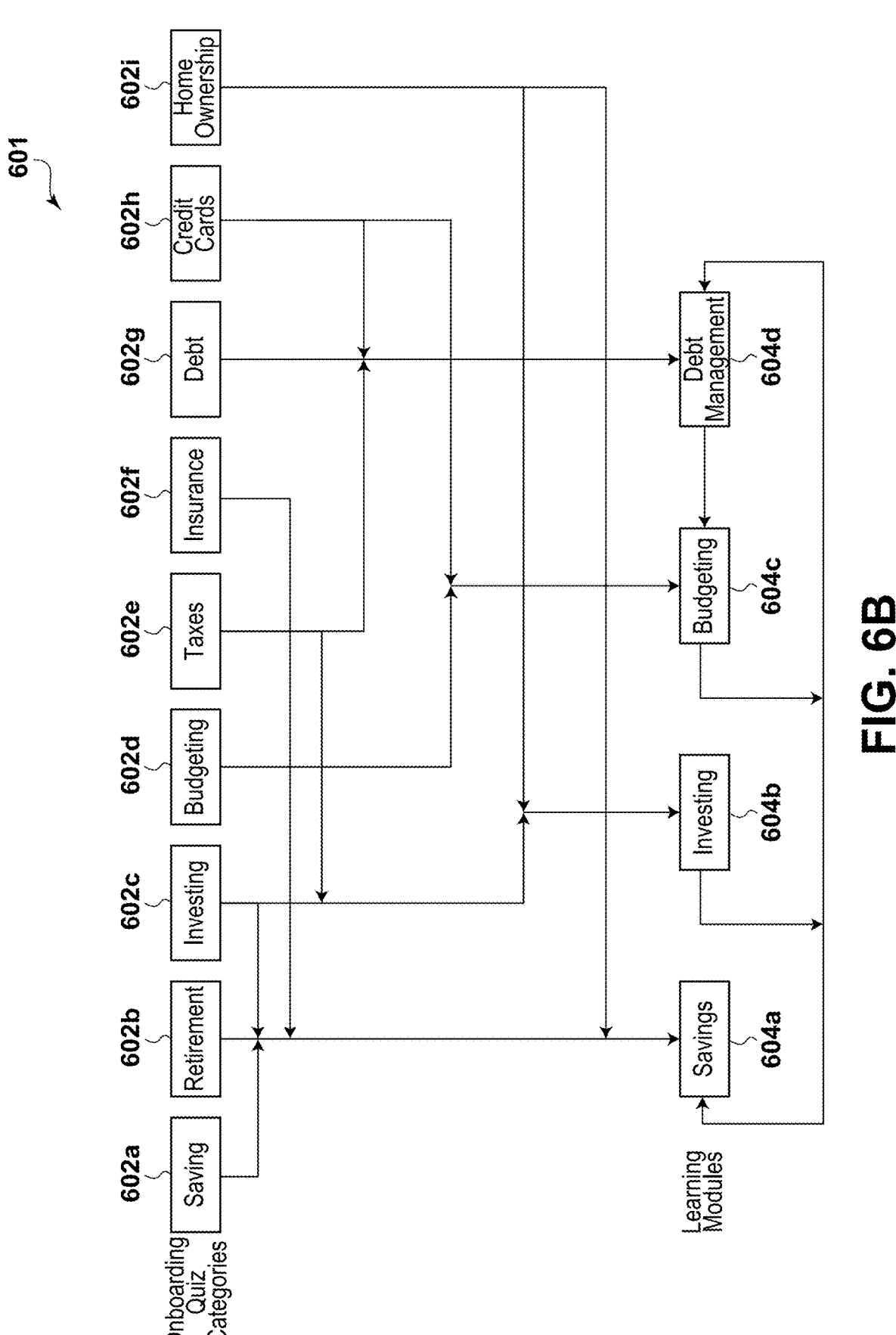
FIG. 6B depicts a flowchart showing the mapping between information acquired from a user via the interests page of FIG. 6A to customized learning modules for use by the user.

The topics in which the user indicates interest are mapped to a flowchart 601 shown in FIG. 6B, which shows the mapping between information acquired from a user via the interests page of FIG. 6A to customized learning modules for use by the user. The topics of saving, retirement, investing, budgeting, taxes, insurance, debt, credit cards, and home ownership depicted on the interests page 600 are respectively mapped to blocks 602a-i of FIG. 6B. Blocks

602a-i are mapped to four different learning modules: a savings learning module 604a, an investing learning module 604b, a budgeting learning module 604c, and a debt management learning module 604d. Saving at block 602a is mapped to the savings learning module 604a; retirement at block 602b is mapped to the savings and investing learning modules 604a,b; investing at block 602c is mapped to the investing learning module 604b; budgeting at block 602d is mapped to the budgeting learning module 604c; taxes at block 602e is mapped to the investing and debt management learning modules 604b,d; insurance at block 602f is mapped to the savings learning module 604a; debt at block 602g is mapped to the debt learning module 604d; credit cards at block 602h is mapped to the budgeting and debt management learning modules 604c,d; and home ownership at block 602i is mapped to the savings and investing learning modules 604a,b.

If the user completes the savings learning module 604a, the platform 100 may suggest to the user that they next complete the debt management learning module 604d; if the user completes the investing learning module 604b, the platform 100 may suggest to the user that they next complete the savings learning module 604a; if the user completes the budgeting learning module 604c, the platform 100 may suggest to the user that they next complete the debt management learning module 604d; and if the user completes the debt management learning module 604d, the platform 100 may suggest to the user that they next complete the savings or budgeting learning modules 604a,c. This is indicated by the various arrows directly connecting various of the learning modules 604a-d to each other in FIG. 6B.

The platform 100 also collects personalized financial information from the user during onboarding. For example, the frontend on the user device 104 prompts the user for information on their assets and debts. The user device 104 may request the login credentials for each financial institution at which the user has assets (e.g., bank accounts, investment accounts) and debts (e.g., loans, such as lines of credit, student loans, and car loans) in order to permit the backend 306 to automatically retrieve the financial information controlled by those institutions. The backend 306 may also retrieve bank/asset or credit card transaction histories from those institutions in order to determine spending and cash flow information.

Additionally or alternatively, the user device 104 may also request the user manually enter financial information. This information may comprise information regarding salary, monthly spending/cash flow, province and city of residence, residential status, socioeconomic situation, and lifestyle. The financial information collected during onboarding may be used by the platform 100 when generating recommendations for the user, as discussed further below in respect of FIGS. 4 and 8.

Figure 7:
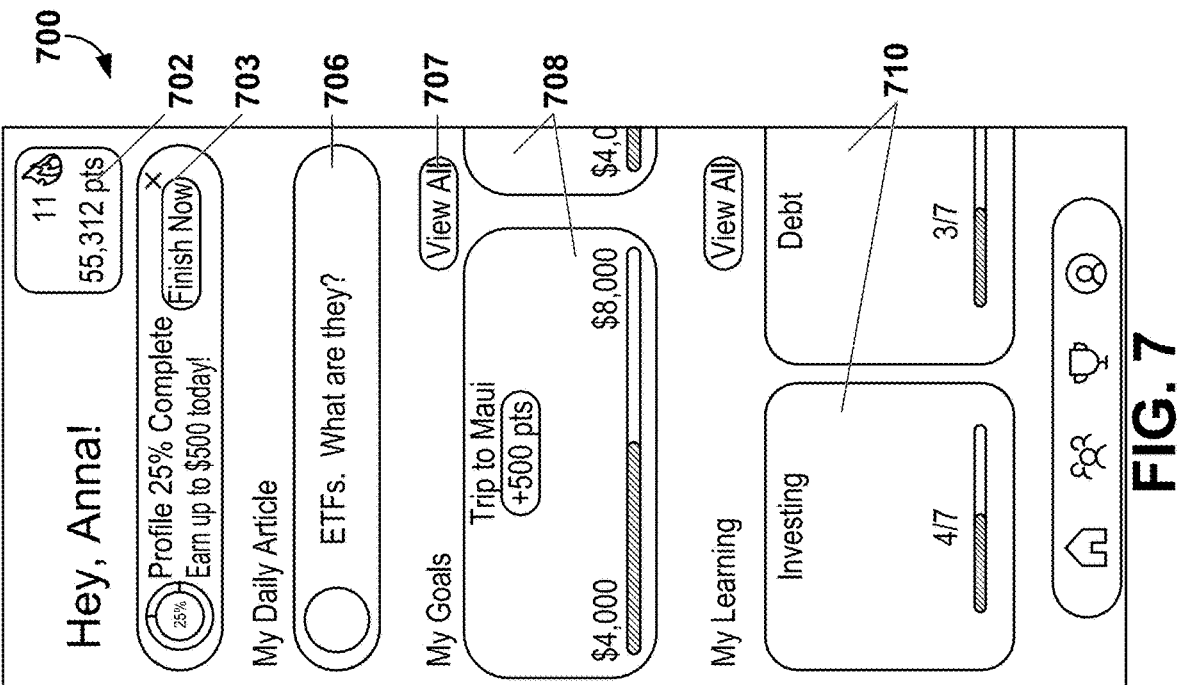

Following onboarding, the frontend of the platform 100 displays a launch page 700 as depicted in FIG. 7 on the user device 104. The launch page 700 comprises a rewards points tracker 702, in which the platform 100 awards points based on successfully achieving goals such as savings goals discussed further below, or completing learning modules, for example. The points correspond to real-world rewards, such as loyalty rewards points (e.g., travel points such as the Royal Bank of Canada™ Avion™ reward points). The launch page 700 also depicts an in-platform credits tracker 704, which are credits not directly redeemable for real-world rewards. In-platform credits may or may not be convertible to real-world rewards, such as the loyalty reward points tracked by the rewards points tracker 702.

Figure 9:
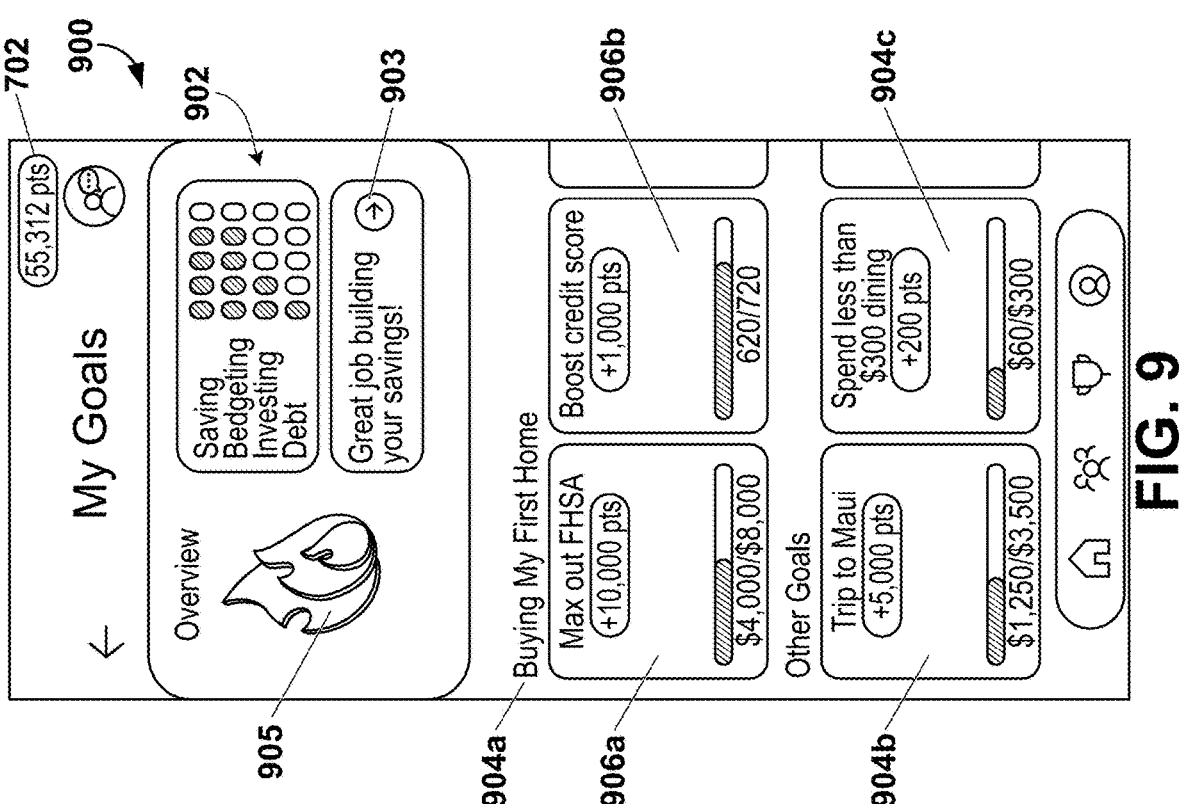

The launch page 700 also comprises a profile button 703, which when pressed brings the user to a profile page where they can view, and optionally enter additional, profile information; an article button 706, which when pressed displays to the user a particular article of interest on a financial topic; an overall goals button 707, which when pressed brings up a goals page 900 as depicted in FIG. 9; specific goals buttons 708, which when pressed brings up one of the pages 1404-1408 as depicted in FIGS. 14B-14D and for which each of the goals is a financial goal; and learning module buttons 710, which when pressed direct the user to one of the learning pages 1200 depicted in FIGS. 12A-12D. The topics displayed on the learning module buttons 710 are based on the learning modules 604a-d identified as being of interest to the user in accordance with FIG. 6B.

Learning Modules

In response to any of the learning module buttons 710 being pressed, the frontend on the user device 104 changes to display the corresponding learning page 1200 of one of FIGS. 12A-12D. Namely, the learning pages 1200 of FIGS. 12A-12D respectively correspond to investing, debt management, budgeting, and saving of blocks 604b, 604d, 604c, and 604a of FIG. 6B. When the user device 104 is a touch enabled device, the user may slide left and right between the various pages 1200.

Figures 13A, 13B, 13C, 13D:
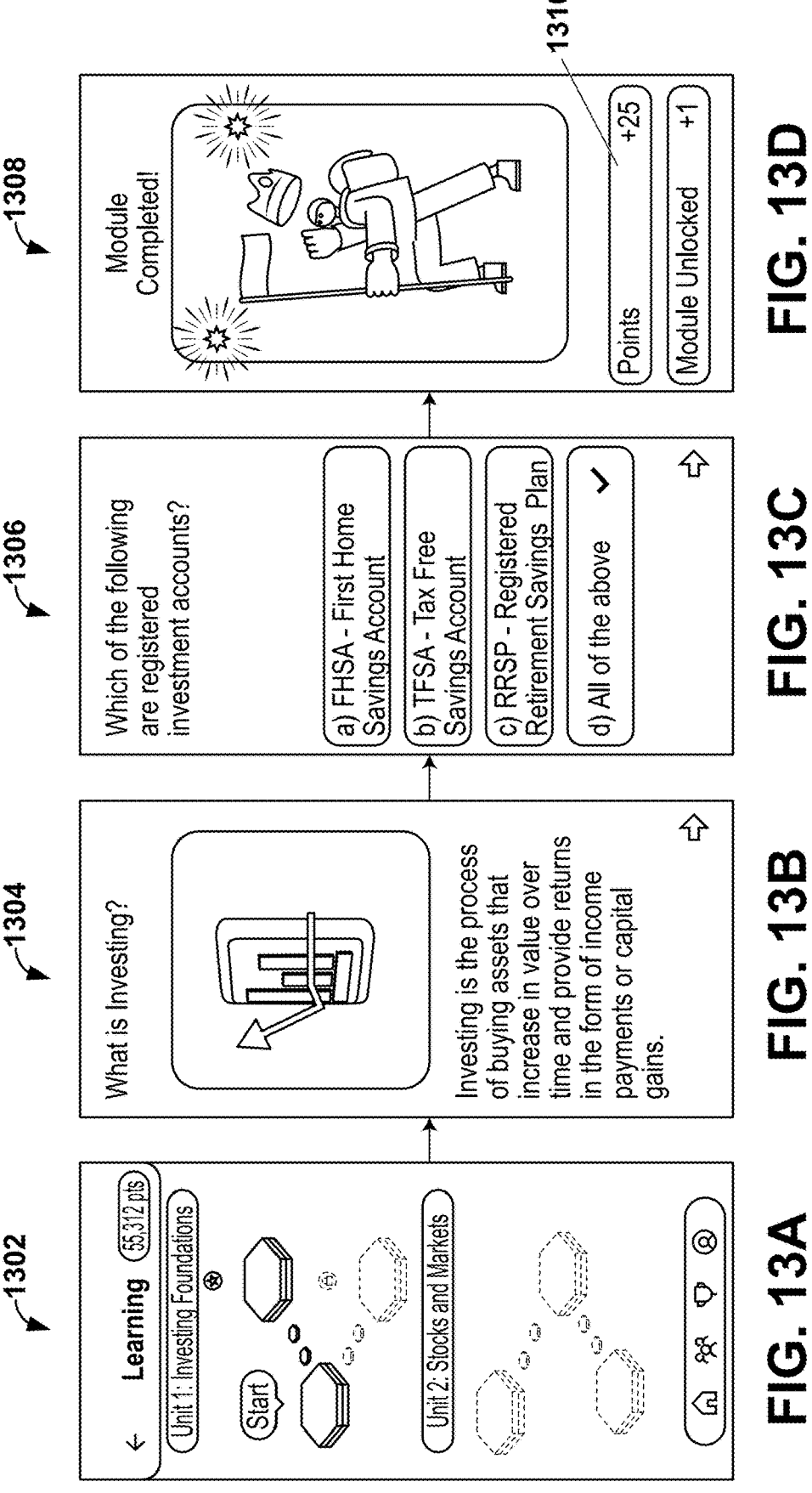
FIGS. 13A to 13D collectively depict various pages of the graphical user interface of the learning and personal data management platform as a user progresses through a learning module, according to an example embodiment.

Each of the learning pages 1200 comprises the rewards points tracker 702; a level tracker 1204, which tracks the user's progress through the learning module; an about button 1206, which when pressed brings up a screen providing an overview of the learning module; an articles button 1208, which when pressed brings up articles relevant to the topic being studied in the learning module; and a map button 1210, which when pressed brings the user to a map representative of a learning progression for a particular learning module, such as the map page 1302 depicted in FIG. 13A for the learning page 1200 corresponding to investing of FIG. 12A.

Starting at the map page 1302 of FIG. 13A, the user progresses in sequence to an information page 1304 generally describing the topic being studied in the learning module; a quiz page 1306 quizzing the user on the topic being studied in the learning module; and a celebration page 1308 celebrating successful completion of the learning module. As a reward for completing the learning module, the user receives a certain number of loyalty reward points, as indicated by a reward indicator 1310. While the platform 100 awards reward points in this example, in at least some other examples the reward may additionally or alternatively be in-platform credits.

While FIGS. 13A-13D are directed at learning about investing, the platform 100 brings the user through analogous learning progressions for the debt management, budgeting, and saving modules as well.

Recommendations

In at least some embodiments, the backend 306 tracks one or more metrics associated with the user's account, such as daily change in assets, total savings, or total debts. In the event those one or more metrics are satisfied (e.g., the daily change in a user's cash position is more than a preset trigger threshold, such as $4,000), the backend 306 offers user-personalized recommendations to take specific action. For example, if the user has indicated their goals are save $10,000 in a tax free savings account and save $2,500 for a vacation, automatically in response to the user depositing $4,000 in their bank account in a single day, the backend 306 may suggest that the user deposit $3,000 in their tax free savings account and move $1,000 to another account allocated for their vacation. An example of this type of recommendation is displayed as a recommendation window 712, overlaid on the launch page 700, as shown in FIG. 8.

Figure 4:
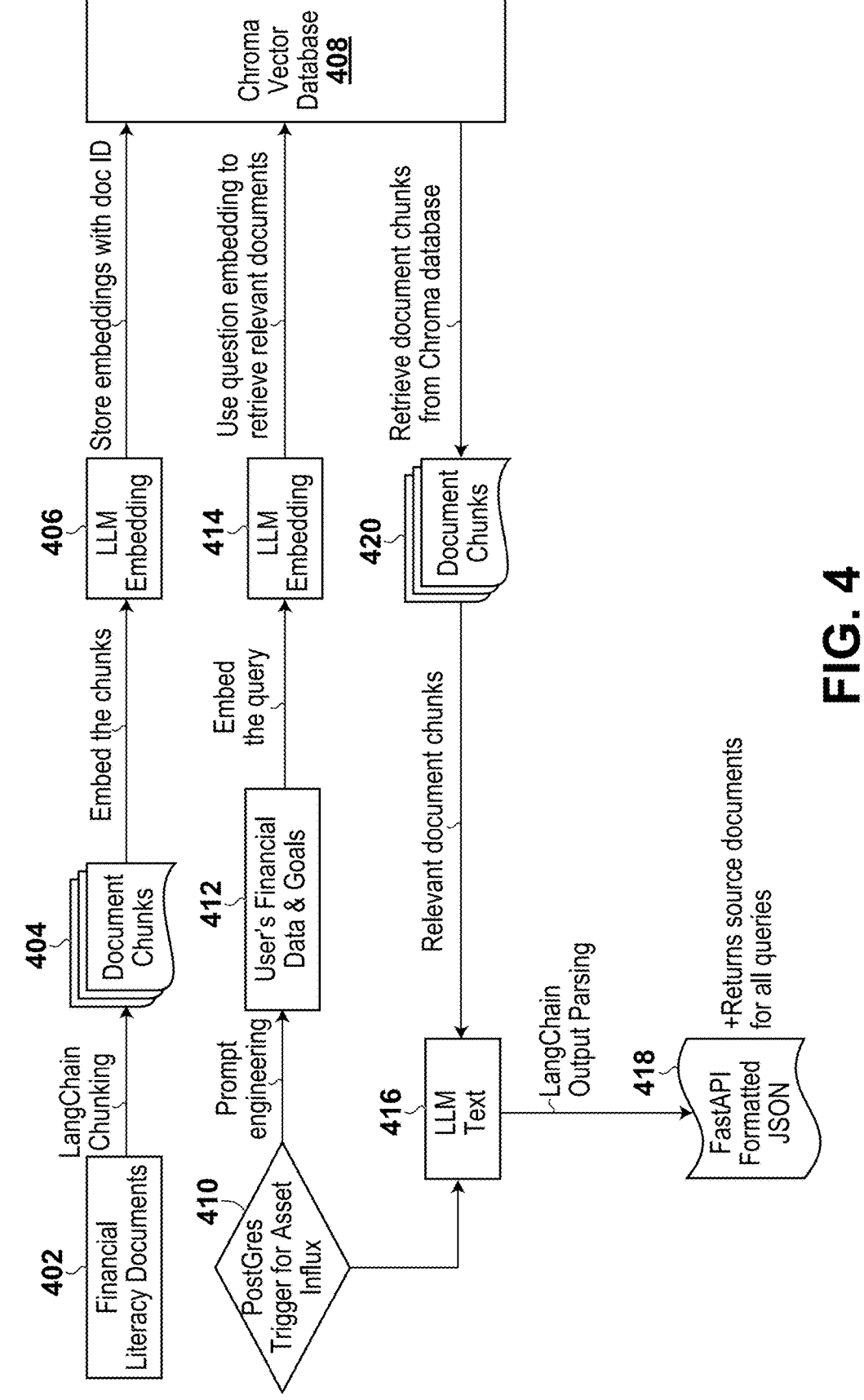
FIG. 4 is a flowchart depicting use of a large language model that comprises part of the learning and personal data management platform, according to an example embodiment.
Figure 5D:
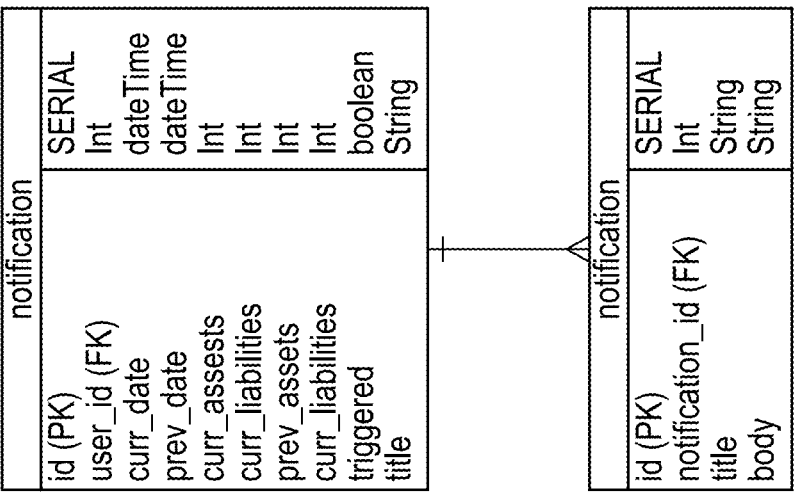

Additionally or alternatively, the recommendation may be displayed as a notification leveraging the schema 500 of FIG. 5D. Various examples of notifications windows 1602-1608 are displayed in FIGS. 16A to 16D. FIGS. 16A and 16B represent example natural language queries that may be used in conjunction with an LLM, as described further below in respect of FIG. 4. These example natural language queries are in respect of goals that the user may have (e.g., how to invest a bonus or save for a vacation). The notification window 1606 of FIG. 16C is used to display a recommendation analogous to that shown in the recommendation window 712 of FIG. 8. The notification window 1608 of FIG. 16D shows an example output from the advisor API that leverages a mapping API, such as the Google Maps™ API.

Figure 8:
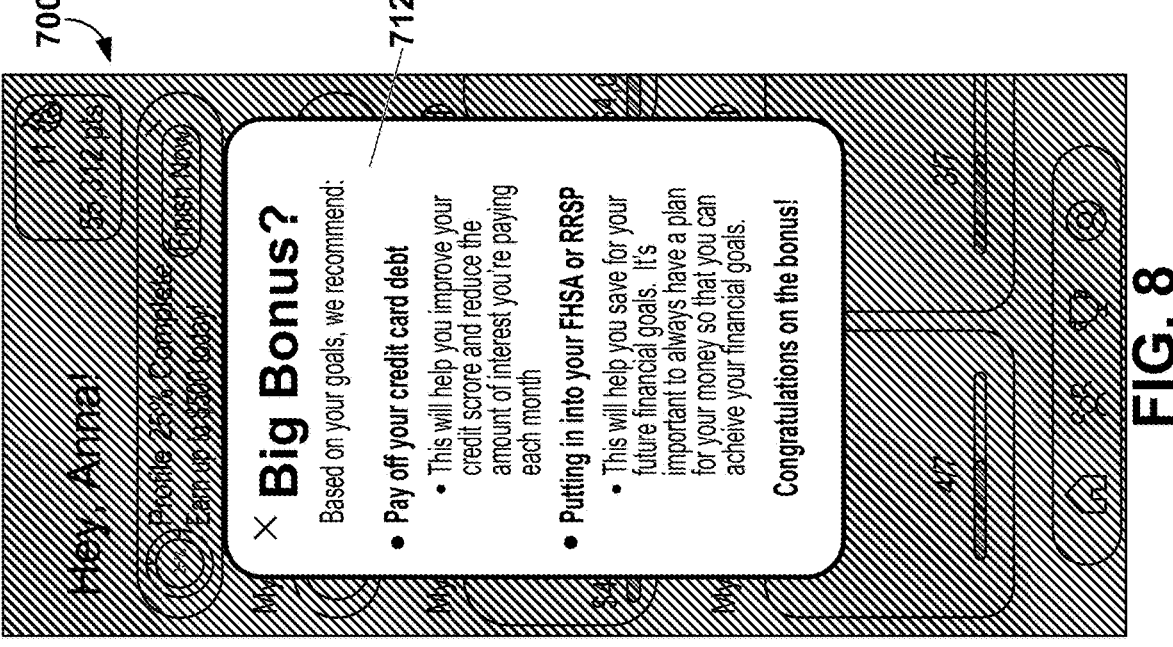
FIGS. 7 and 8 depict two examples of a launch page of a graphical user interface presented to a user of the learning and personal data management platform, according to an example embodiment.

The recommendation window 712 of FIG. 8 recommends that the user pay off credit card debt and put cash into registered investment accounts in response to a daily change in the user's cash position in excess of the preset trigger threshold. However, in different embodiments, metrics in addition or as an alternative to a daily change in cash position may be used to generate recommendations. Recommendations may be based on the user's goals as stated during onboarding, for example. For example, even with no material change in the user's daily cash position, if the user has indicated during onboarding that paying off debt is a goal and has total free cash exceeding a threshold in their accounts, the backend 306 may recommend the user pay down debt with that free cash. As another example, if the user has indicated during onboarding that investing is a priority and has total free cash exceeding a threshold in their accounts, regardless of any daily cash fluctuation the backend 306 may recommend the user invest that free cash into an investment account such as a registered investment account.

The recommendation displayed in the recommendation window 712 may be generated using a large language model ("LLM"). FIG. 4 depicts a flowchart 400 depicting use of an LLM according to an example embodiment. The LLM may comprise, for example, the OpenAI™ ChatGPT™ 3.5 Turbo LLM, or a Falcon™ 40B LLM.

Various reference documents in the form of financial literacy documents are used as training materials at block 402. These materials may comprise, for example, information circulars and educational materials prepared for investors or financial institution customers. Those textual materials are then broken up into document chunks 404 of text. Chunking the documents helps to reduce the amount of text eventually sent to the LLM, which is technically beneficial by helping to reduce latency of and the number of tokens required by the LLM. The Hugging Face™ all-MiniLM-L6-v2 transformers model may be used with a chunk_size of 500 and chunk_overlap of 50 for chunking. Those document chunks 404 are converted into vectors as LLM embeddings at block 406 ("document vectors"), which are then stored into a vector database 408 together with document identifiers identifying the corresponding document chunks of block 404. The vector database 408 may comprise a Chroma™ vector database 408.

At block 410, the backend 306 determines whether LLM usage has been triggered such as described above. The trigger may be a PostgreSQL™ trigger, for example, when the data store 308 comprises a relational database running PostgreSQL™ as contemplated above. More particularly, Plaid™ API endpoints reading the user's assets and liabilities across all their accounts may be scheduled daily as a cron job. This information, collected daily, may be aggregated in the backend 306 via FastAPI™ API and stored in the data store 308, and as mentioned above the trigger may be a day over day fluctuation in assets that exceeds a certain trigger threshold, such as 5%.

In response to a trigger, the backend 306 through prompt engineering (e.g., asking questions specifically requesting the user enter their financial data and goals) or data stored in the data store 308 obtains a textual query related to the user's financial data or goals at block 412. This may be entered manually by the user, or alternatively the user may select from a list of example financial goals as referenced above in respect of FIGS. 16A and 16B. This query is converted to vectors at block 414 ("query vectors") analogously as described above for block 406.

The query vectors are sent to the vector database 408. The vector database 408 semantically searches the document vectors it has stored to identify those document vectors that are similar to or best match the query vectors. The document vectors that are the best match to the query vectors are also associated with document identifier(s) as described above. The query vectors are accordingly matched to the document chunks corresponding to the document vectors that are the best match to the query vectors based on the document identifier(s) using LangChain™ at block 420. Those document chunks are fed in as context to the LLM at block 416, which produces an answer using the document chunks as context. The LLM passes its answer in FastAPI™—formatted to a FastAPI™ endpoint, which returns source documents related to the query.

In summary, FIG. 4 describes a process in which:
1. The user enters a query (block 412).
2. The backend 306 creates embeddings for the user prompt, which are the query vectors (block 414).
3. The backend 306 searches the vector database 408 for the document vectors and associated document chunks that are nearest to the query vectors (block 408).
4. The backend 306 retrieves the actual text of the document chunks corresponding to the embedding that is nearest to the query vectors (block 420).
5. The backend 306 creates a new prompt that comprises the user's query as well as the context from the retrieved document (block 416). The newly crafted prompt is passed to the LLM.
6. The LLM's output may be parsed using LangChain™, for example, to obtain a JSON-formatted output that may be input to various APIs via FastAPI™ (block 418).
7. The response from the LLM is then returned to the user.
8. The backend 306 may also, in at least some embodiments, provide a link to one or more documents where the user can obtain additional information (i.e., the one or more documents of block 402).

FIG. 15 depicts a prompt engineering example 1500 as referenced above in FIG. 4 and, more particularly, that may be used in conjunction with an LLM to generate recommendations to help the user achieve at least one goal. The example 1500 comprises the user's financial goals 1502, prepopulated user financial data 1504, few-shot (e.g., one-shot) prompting techniques 1506, and JSON output schema 1508. The few-shot prompting technique 1506 comprises an example natural language query and examples responses, each comprising a recommendation title and a recommendation body. This same format is used when prompting the LLM to output a response using the JSON output schema

1508, where FIG. 15 shows the LLM being instructed that the JSON object's keys are also, for each recommendation, a response title and response body. The example 1500 instructs the LLM to offer qualitative recommendations using few-shot prompting techniques to improve the quality of the LLM's output. More particularly, in the example of FIG. 15, the LLM is fed the user's data and is instructed to be helpful and act as a financial professional; however, any recommendations provided by the LLM are strictly qualitative and any action taken past that point is left up to the user. Examples are also provided to the LLM so it understands how to return and properly format answers.

The example recommendations described above follow the JSON output schema 1508 of FIG. 15. In FIGS. 8 and 16C, for example, the key "recommendation_1_title" may be "Pay off your credit card debt", "recommendation_1_body" may be the indented text immediately below "Pay off your credit card debt", "recommendation_2_title" may be "Putting it into your FHSA or RRSP", and "recommendation_2_body" may be the indented text immediately below "Putting it into your FHSA or RRSP". In FIG. 8, the recommendations are generated automatically in response to the user's assets exceeding a trigger threshold, while in FIG. 16C the recommendations are generated in response to the user selecting particular natural language queries as depicted in FIGS. 16A and 16B.

In at least some embodiments, the user is automatically referred to a financial advisor in response to a daily asset change exceeding a trigger threshold (e.g., $5,000). In those situations, in response to the deposit the backend 306 may automatically call the advisor API to obtain the contact credentials of one or more financial advisors within a certain proximity of the user's address, and display those credentials to the user via the frontend on the mobile device 104.

Profile

Figure 10:
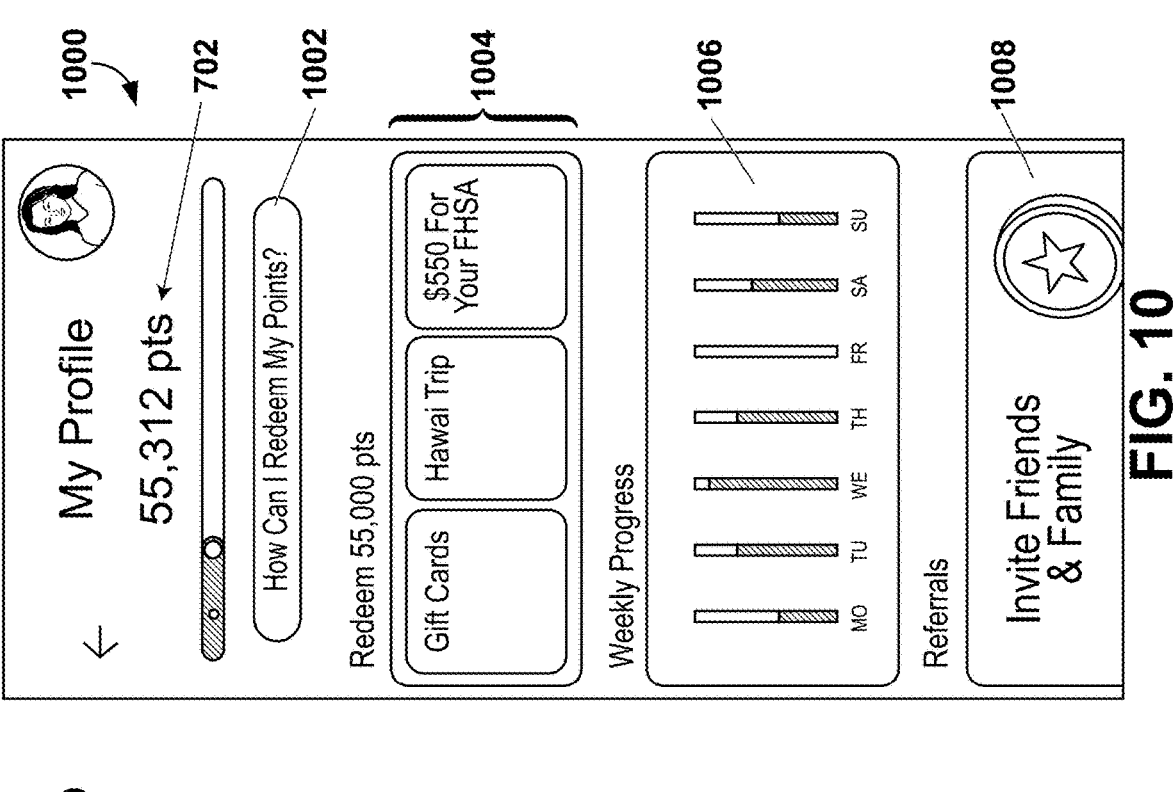
FIGS. 9 and 10 respectively depict a goals page and a profile page that comprise part of the graphical user interface of the learning and personal data management platform, according to an example embodiment.

The user may press the profile button 703 from the launch page 700. As indicated in FIG. 7, the user may be prompted to do this if their profile is incomplete, and may receive loyalty rewards points in response to completing their profile. Regardless, after pressing the profile button 703 the user is brought to a profile page 1000 as shown in FIG. 10.

The profile page 1000 comprises the rewards points tracker 702; a redeem information button 1002, which provides information to the user about how to redeem their loyalty rewards points; redemption buttons 1004, which permit the user to redeem their loyalty rewards points for certain real-world rewards, such as gift cards, trips, cash for investing, and cash to pay for trading fees when trading securities; a progress tracker 1006, which tracks the user's use of the platform 1000; and a referrals button 1008, which prompts the user to invite their contacts to try the platform. When redeeming the loyalty rewards points, the backend 306 converts the points to be redeemed into a real-world (e.g., cash) equivalent, and proceeds with redemption using that equivalent.

Additionally, even if the user is not a member of the loyalty rewards program corresponding to the loyalty rewards points, the backend 306 may nonetheless award and track loyalty reward points to the user. When the user attempts to learn how to redeem the points, such as by pressing the redeem information button 1002, the user may be presented with information about how to join the loyalty rewards program. Instead of starting with no points, the user may join the program with the number of points they have earned on the platform 100, thereby encouraging participation in the program.

Figure 17:
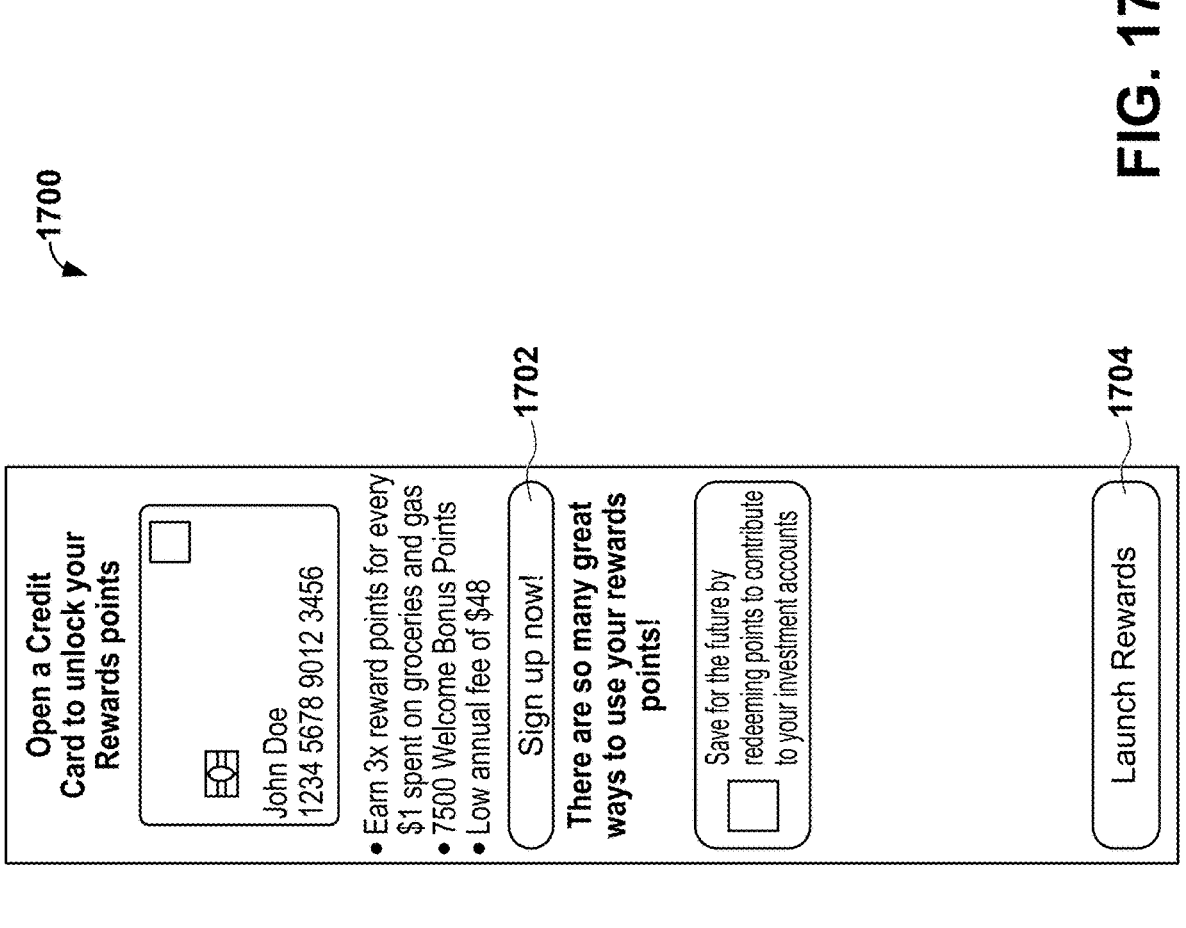
FIG. 17 depicts an overlay displayed to a user of the learning and personal data management platform in respect of loyalty rewards points, according to an example embodiment.

An example overlay that may be displayed on the profile page 1000 to present the user with information on joining the loyalty rewards program is shown as the overlay 1700 of FIG. 17. The overlay 1700 includes a sign up button 1702, that permits a user who is not a member of the loyalty rewards program to sign up as a member, optionally making use of the loyalty rewards points they earned on the platform 100 even prior to becoming a member; and a launch button 1704 that automatically launches another software application on the user device 104 specific to the loyalty rewards program.

Financial Health

Figure 11B:
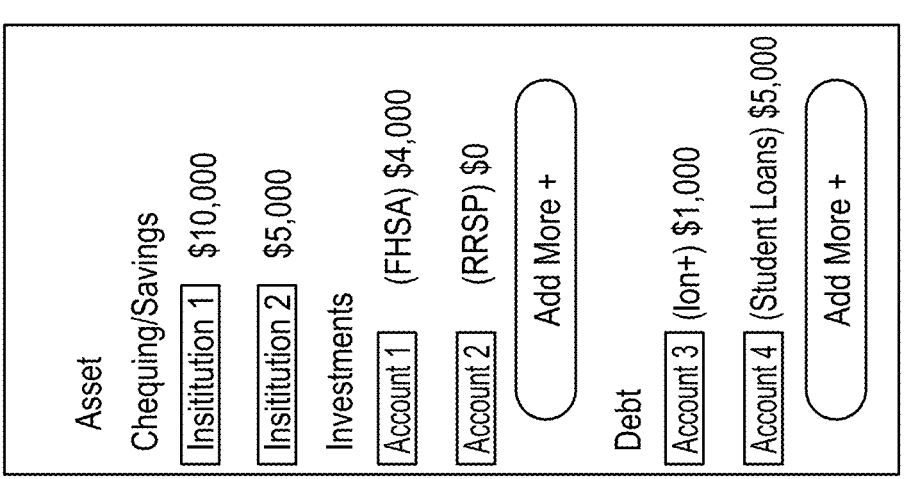
FIGS. 11A and 11B respectively depict an asset/debt health page and account page of the graphical user interface of the learning and personal data management platform, according to an example embodiment.
Figure 11A:
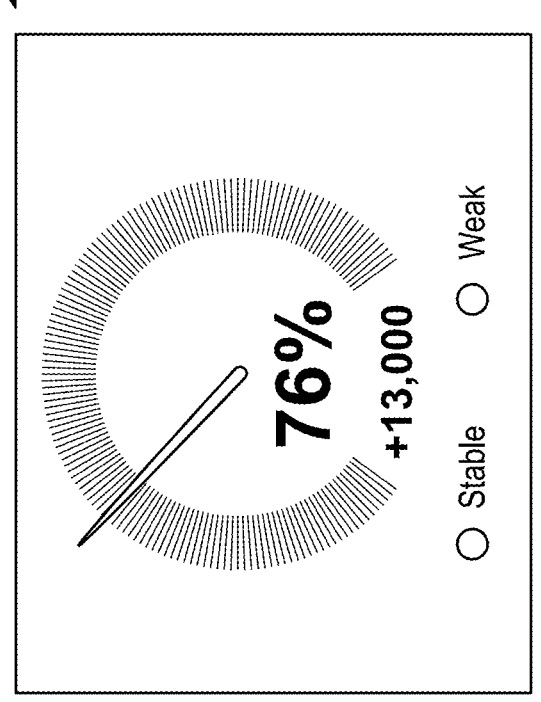

The user may also navigate to a financial health page, which displays an asset/debt health page 1102 and an account listing page 1104 as respectively depicted in FIGS. 11A and 11B. The asset/debt health page 1102 graphically and quantitatively shows the relationship of assets to debts for the user (in FIG. 11A, of the user's cumulative assets and debts, 76% is assets), while the account page 1104 lists various asset (chequing/savings and investment accounts) and debt accounts of the user. The backend 306 may obtain the information depicted on the pages 1102, 1104 either from the data store 308 or the APIs 304, depending on where the requisite data is stored and the importance of accessing real-time vs. potentially stale data.

Goals

In response to pushing the overall goals button 707 the user is brought to the goals page 900 of FIG. 9. The goals page 900 comprises the rewards points tracker 702; a ranking tracker 902, which ranks the user's performance in respect of saving, budgeting, investing, and debt, and which may leverage public APIs such as Mint™ API(s), YNAB™ API(s), or PocketGuard™ API(s) to obtain a user's related financial information; a recommendation button 903, which displays a financial recommendations in a manner analogous as the recommendation window 712 and which, when pressed, brings the user to the goals information page 1402 of FIG. 14A; first through third goal buttons 904a-c; and first and second task buttons 906a,b, which are to be completed in order to complete goals. Adjacent the ranking tracker 902 is a graphical rewards indicator 905 corresponding to the user's performance as determined by the ranking tracker 902. In this example, the graphical rewards indicator 905 comprises a flame whose intensity varies directly with the user's financial health. When any of the goal 904a-c or task buttons 906a,b are pressed, the user is directed to pages analogous to those depicted in FIGS. 14B to 14D.

As mentioned above, the platform 100 uses a database schema 500 that comprises goals broken into tasks, and tasks broken into tasks. For example, if a user's goal is saving for their first home, that user may have three corresponding tasks: a first task of making maximum contributions to a Canadian First Home Savings Account ("FHSA") (a type of registered investment account) specifically designed for home down payments; a second task of improving their credit score; and a third task of making maximum contributions to a Canadian Registered Retirement Savings Plan ("RRSP") (a type of registered investment account) that can also be used towards a home down payment. Each of those tasks has one or more corresponding tasks: the first task may comprise a single task comprising automatically depositing a set amount into the user's FHSA; the second task may comprise a first task of paying the user's outstanding credit card balances monthly, and a second task of using less than a certain percentage (e.g., 30%) of the user's credit limit monthly; and the third task may comprise a single task of automatically depositing a set amount into the user's RRSP.

Also as shown in FIG. 9, completing goals is associated with a reward in the form of a certain amount of loyalty rewards points. Additionally, the various goal 904a-c and task buttons 906a,b show progress bars indicating degree of completion by the user.

Referring now to FIG. 14A, there is shown a goals information page 1402 that the frontend displays to the user via the user device 104 in response to the user pressing the recommendation button 903. The goals information page 1402 presents information related to the goal displayed on the recommendation button 903. The example page 1402 of FIG. 14A provides information on RRSPs and comprises a task button 1410 that transfers cash from the user's bank account to their RRSP account. As with other actions suggested by the platform 100, completing the action results in a reward of loyalty rewards points as indicated on the task button 1410. The task button 1410 is an example of a graphical interface element that the user may select in order to perform a task that advances them closer to their goal, which in this example is investing in a savings plan that helps them achieve their goal of owning a home.

Referring now to FIG. 14B, there is shown an investment page 1404 that the frontend displays to the user via the user device 104 in response to the user pressing the first task button 906a of FIG. 9. The investment page 1404 shows a historic growth of the investment 1412; a progress bar 1414 visually indicating the user's progress towards their investment goal; a task button 1416 that, when pressed, performs the task associated with the investment goal of automatically depositing an amount of money into the user's FHSA; and investment metrics 1418 such as value, net deposits, earnings, and rate of return of the FHSA. The loyalty rewards points associated with completing the task is displayed on the task button 1416.

Referring now to FIG. 14C, there is shown a credit score page 1406 that the frontend displays to the user via the user device 104 in response to the user pressing the second task button 906b of FIG. 9. The credit score page 1406 shows a progress bar 1420 visually indicating the user's progress towards their desired credit score; first and second task buttons 1422a,b that, when pressed, respectively performs the tasks associated with achieving their credit score goal as described above in respect of FIG. 9; a connected account button 1424 displaying the credit card affecting the user's credit rating; and a credit usage progress bar 1426 indicating how much credit the user has used in a given month. In FIG. 14C, the second task button 1422b shows the loyalty rewards points to be awarded when the task is successfully completed, while the first task associated with the first task button 1422a has already been completed and consequently the first task button 1422a shows its associated loyalty rewards points as having been redeemed.

Referring now to FIG. 14D, there is shown a shared rewards page 1408 that the frontend displays to the user via the user device 104 in response to the user pressing the second goal button 904b. In this example, the shared reward is a vacation to Maui to be shared by a group of five friends. Each of the five friends is to independently save a certain amount ($3,000) in FIG. 14D, although in at least some other embodiments (not depicted) the group may collectively contribute towards a shared goal (e.g., the goal may appear as $15,000, and any user can contribute up to that amount until the goal is reached). The shared rewards page 1408 comprises a target vacation day 1428; a progress bar 1430 showing the user's progress towards their financial goal; a first graphical interface element comprising group progress bars 1434 showing each group member's progress towards their respective goals; an account button 1436 that displays and when clicked brings the user to the account used to save towards the user's financial goal; a second graphical interface element comprising a task button 1432 that, when pressed, performs the task of automatically depositing a certain amount of money towards the group's shared goal; and a contribution update button 1438 that displays the user's current automatic monthly contribution and that, when pressed, allows the user to change that contribution. The loyalty rewards point associated with completing the task is displayed on the task button 1432.

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, additional example processing units comprise an application-specific integrated circuit (ASIC), field programmable gate array (FPGA), system-on-a-chip (SoC), artificial intelligence accelerator, or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a processor" or "the processor" does not exclude embodiments in which multiple processors are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

It is contemplated that any part of any aspect or embodiment discussed in this specification can be implemented or combined with any part of any other aspect or embodiment discussed in this specification, so long as such those parts are not mutually exclusive with each other.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A natural language query processing method, the method comprising:

(a) obtaining a natural language query related to personal financial data of a user;

(b) generating query vectors comprising embeddings of the natural language query;

(c) matching the query vectors with document vectors generated from chunks of reference documents related to the personal financial data;

(d) retrieving the chunks from at least one database;

(e) generating a response to the natural language query by inputting to at least one large language model a prompt comprising:

(i) the natural language query; and (ii) the chunks as context for use in responding to the natural language query; and (f) providing the response to the user, wherein the method further comprises, prior to the obtaining of the natural language query, detecting a trigger resulting from a change in the personal financial data of the user, wherein the change comprises at least one of asset or liability values of the user as stored in the at least one database exceeding a trigger threshold, and wherein the obtaining of the natural language query is performed in response to the trigger.

2. The natural language query processing method of claim 1, wherein the document vectors are associated in the at least one database with respective identifiers identifying the reference documents used to generate the document vectors, and wherein the method further comprises:

(a) generating a link to at least one of the reference documents, respectively, wherein the generating comprises identifying the at least one of the reference documents corresponding to at least one of the chunks by matching the at least one of the identifiers of the at least one of the reference documents to at least one of the document vectors generated from the at least one of the chunks; and (b) providing the link to the user.

3. The natural language query processing method of claim 1, further comprising intermittently updating the at least one of the asset or liability values in the at least one database by collecting the at least one of the asset or liability values through at least one application programming interface ("API") endpoint providing access to third party services, wherein the collecting comprises accessing the third party services using respective login credentials or biometric identification of the user.

4. The natural language query processing method of claim 1, wherein the change comprises the asset values of the user increasing within a single day by more than the trigger threshold.

5. The natural language query processing method of claim 1, further comprising, prior to the obtaining of the natural language query:

(a) generating the chunks from the reference documents, wherein the reference documents are associated with respective identifiers;

(b) generating the document vectors from the chunks; and (c) storing the document vectors with the identifiers in the at least one database.

6. The natural language query processing method of claim 1, further comprising:

(a) obtaining the personal financial data of the user;

(b) obtaining at least one goal of the user related to the personal financial data through a graphical user interface;

(c) determining that the user has satisfied the at least one goal; and (d) in response to the user satisfying at least one of the at least one goal, crediting the user with points.

7. The natural language query processing method of claim 6, wherein each of the at least one goal is stored in the at least one database as a first lookup table, wherein each of the at least one goal comprises at least one task, and wherein each of the at least one task is stored in the at least one database as a second lookup table.

8. The natural language query processing method of claim 7, wherein each of the at least one goal comprises part of a user plan, and wherein the user plan is stored in the at least one database as a third lookup table.

9. The natural language query processing method of claim 6, wherein the points are allocated by a points provider, and wherein the crediting the user with the points comprises instructing the points provider to credit the user with the points and providing credentials of the user for the points provider to the points provider.

10. The natural language query processing method of claim 6, wherein the at least one goal comprises a shared goal that is shared by multiple users of which the user is one, wherein the method further comprises graphically displaying to the user:

(a) a first graphical interface element indicating respective progress towards the shared goal of each of the multiple users; and (b) a second graphical interface element permitting the user to perform a task that causes the user to advance towards the shared goal.

11. The natural language query processing method of claim 10, wherein the shared goal is a monetary savings goal, and wherein the task is to contribute a set amount of funds of the user towards the monetary savings goal of the user.

12. The natural language query processing method of claim 6, wherein the prompt further comprises the personal financial data of the user and the natural language query is in respect of the at least one goal of the user.

13. The natural language query processing method of claim 12, wherein inputting the prompt to the at least one large language model comprises applying a few-shot prompting technique wherein the prompt further comprises an example natural language query and at least one example response, wherein each of the at least one example response comprises a response title and a response body.

14. The natural language query processing method of claim 13, wherein the prompt further comprises instructions to format the response in JavaScript Object Notation (JSON) schema, with at least one respective title and body key for at least one response title and at least one response body to be output by the at least one large language model.

15. The natural language query processing method of claim 14, wherein the at least one response title and at least one response body provide at least one recommendation to advance towards the at least one goal to the user, and wherein the method further comprises submitting the JSON-formatted response to an API that displays the at least one recommendation to the user.

16. The natural language query processing method of claim 15, further comprising displaying to the user on the same screen as the at least one recommendation, a graphical interface element permitting the user to perform a task that causes the user to advance towards the at least one goal.

17. The natural language query processing method of claim 6, further comprising:

(a) displaying to the user an interactive learning module related to the at least one goal; and (b) following completion of the interactive learning module by the user, crediting the user with additional ones of the points, wherein the points are allocated by a points provider, and wherein the crediting the user with the points comprises instructing the points provider to credit the user with the points and providing credentials of the user for the points provider to the points provider.

18. A system comprising:

(a) at least one network interface;

(b) at least one processing unit communicatively coupled to the at least one network interface and configured to perform a natural language query processing method, the method comprising:

(i) obtaining a natural language query related to personal financial data of a user;

(ii) generating query vectors comprising embeddings of the natural language query;

(iii) matching the query vectors with document vectors generated from chunks of reference documents related to the personal financial data;

(iv) retrieving the chunks from at least one database;

(v) generating a response to the natural language query by inputting to at least one large language model a prompt comprising:

(A) the natural language query; and (B) the chunks as context for use in responding to the natural language query; and (vi) providing the response to the user, wherein the method further comprises, prior to the obtaining of the natural language query, detecting a trigger resulting from a change in the personal financial data of the user, wherein the change comprises at least one of asset or liability values of the user as stored in the at least one database exceeding a trigger threshold, and wherein the obtaining of the natural language query is performed in response to the trigger.

19. A non-transitory computer readable medium having stored thereon computer program code that is executable by at least one processor, and that when executed by the at least one processor causes the at least one processor to perform a natural language query processing method, the method comprising:

(a) obtaining a natural language query related to personal financial data of a user;

(b) generating query vectors comprising embeddings of the natural language query;

(c) matching the query vectors with document vectors generated from chunks of reference documents related to the personal financial data;

(d) retrieving the chunks from at least one database;

(e) generating a response to the natural language query by inputting to at least one large language model a prompt comprising:

(i) the natural language query; and (ii) the chunks as context for use in responding to the natural language query; and (f) providing the response to the user, wherein the method further comprises, prior to the obtaining of the natural language query, detecting a trigger resulting from a change in the personal financial data of the user, wherein the change comprises at least one of asset or liability values of the user as stored in the at least one database exceeding a trigger threshold, and wherein the obtaining of the natural language query is performed in response to the trigger.

20. The non-transitory computer readable medium of claim 19, wherein the method further comprises:

(a) obtaining the personal financial data of the user;

(b) obtaining at least one goal of the user related to the personal financial data through a graphical user interface;

(c) determining that the user has satisfied the at least one goal; and (d) in response to the user satisfying at least one of the at least one goal, crediting the user with points.

\* \* \* \* \*